Dec. 8, 1953 C. SAUNDERS 2,661,682

AUTOMATIC STORE

Filed Aug. 30, 1945 24 Sheets-Sheet 1

Inventor

Clarence Saunders

By [signature]

Attorney

Dec. 8, 1953 C. SAUNDERS 2,661,682

AUTOMATIC STORE

Filed Aug. 30, 1945 24 Sheets-Sheet 2

Inventor

Clarence Saunders

By

Attorney

Dec. 8, 1953 C. SAUNDERS 2,661,682

AUTOMATIC STORE

Filed Aug. 30, 1945 24 Sheets-Sheet 3

Inventor

Clarence Saunders

By [signature] Attorney

Dec. 8, 1953 C. SAUNDERS 2,661,682

AUTOMATIC STORE

Filed Aug. 30, 1945 24 Sheets-Sheet 4

Inventor

By Clarence Saunders

R. W. Dahn. Attorney

Inventor
Clarence Saunders
By [signature] Attorney

Dec. 8, 1953

C. SAUNDERS 2,661,682

AUTOMATIC STORE

Filed Aug. 30, 1945

24 Sheets-Sheet 6

Inventor

Clarence Saunders

By H. W. Dahm,

Attorney

Inventor
Clarence Saunders
By
[signature] Attorney

Inventor

Clarence Saunders

By [signature]

Attorney

Dec. 8, 1953 C. SAUNDERS 2,661,682

AUTOMATIC STORE

Filed Aug. 30, 1945 24 Sheets-Sheet 9

Inventor

Clarence Saunders

By [signature]

Attorney

Inventor
Clarence Saunders
By H. W. Dahm, Attorney

Dec. 8, 1953 C. SAUNDERS 2,661,682

AUTOMATIC STORE

Filed Aug. 30, 1945 24 Sheets-Sheet 11

Inventor

Clarence Saunders

By

F. W. Dahn, Attorney

Inventor

Clarence Saunders

Attorney

Dec. 8, 1953 C. SAUNDERS 2,661,682

AUTOMATIC STORE

Filed Aug. 30, 1945 24 Sheets-Sheet 13

Inventor

Clarence Saunders

By [signature]

Attorney

Dec. 8, 1953

C. SAUNDERS 2,661,682

AUTOMATIC STORE

Filed Aug. 30, 1945

24 Sheets-Sheet 14

Inventor

Clarence Saunders

By

[signature]

Attorney

Dec. 8, 1953

C. SAUNDERS 2,661,682

AUTOMATIC STORE

Filed Aug. 30, 1945

24 Sheets-Sheet 15

Inventor

Clarence Saunders

By F. V. Dahm,

Attorney

Dec. 8, 1953 C. SAUNDERS 2,661,682

AUTOMATIC STORE

Filed Aug. 30, 1945 24 Sheets-Sheet 16

Inventor
By Clarence Saunders,
[signature], Attorney

Inventor
Clarence Saunders,
By [signature]
Attorney

Dec. 8, 1953 C. SAUNDERS 2,661,682

AUTOMATIC STORE

Filed Aug. 30, 1945 24 Sheets-Sheet 18

Inventor

Clarence Saunders,

By [signature]

Attorney

Inventor
Clarence Saunders,
By
[signature], Attorney

Inventor
Clarence Saunders,
By [signature]
Attorney

Inventor
Clarence Saunders,
[signature], Attorney

Inventor
Clarence Saunders,
By [signature]
Attorney

Dec. 8, 1953 C. SAUNDERS 2,661,682
AUTOMATIC STORE
Filed Aug. 30, 1945 24 Sheets-Sheet 23
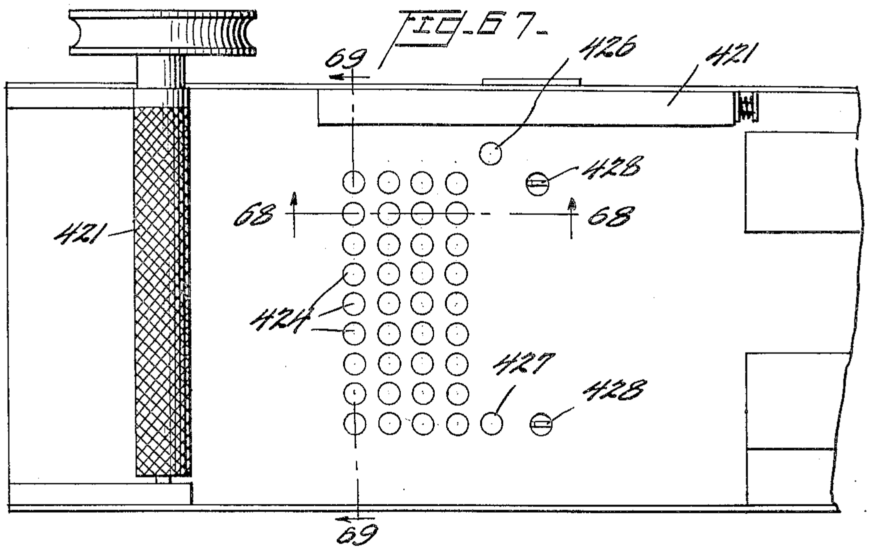
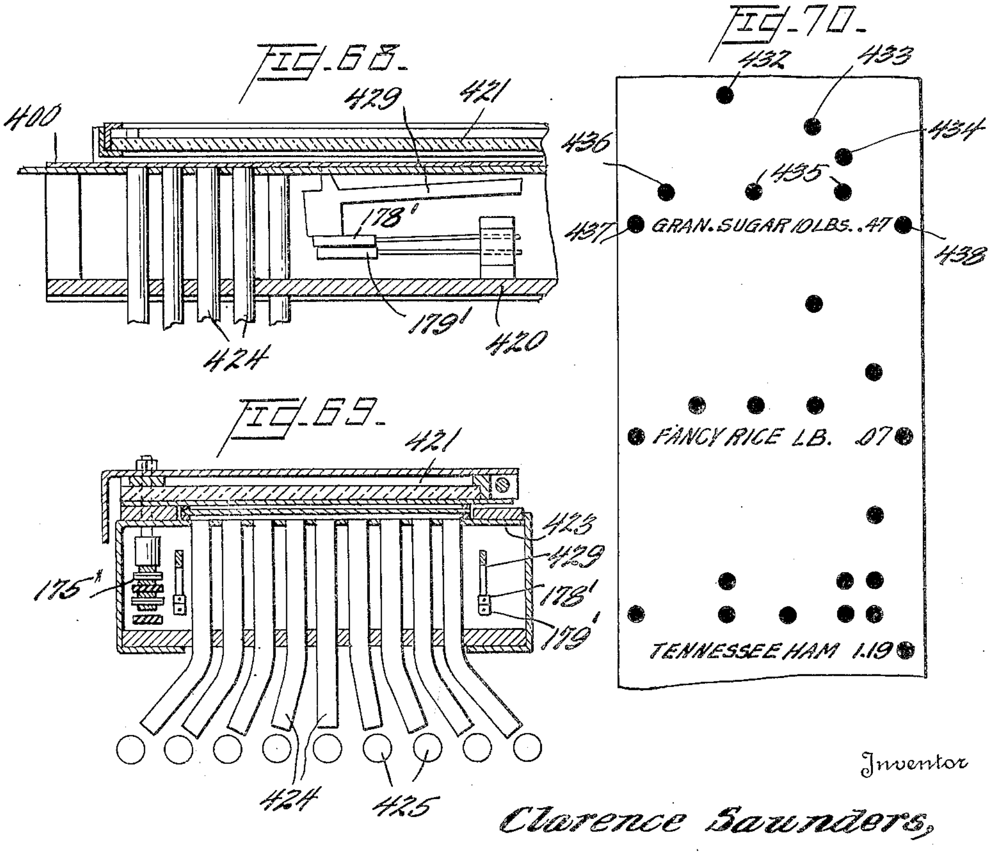
FIG. 67. FIG. 68, FIG. 69, FIG. 70
Inventor
Clarence Saunders,
By F. W. Dahn
Attorney Inventor
By Clarence Saunders
[signature] Attorney Patented Dec. 8, 1953

2,661,682

UNITED STATES PATENT OFFICE 2,661,682

AUTOMATIC STORE

Clarence Saunders, Memphis, Tenn., assignor, by mesne assignments, to Automatic Systems Corporation, Memphis, Tenn., a corporation of Tennessee Application August 30, 1945, Serial No. 613,571

14 Claims. (Cl. 101—19)

Figure 1:
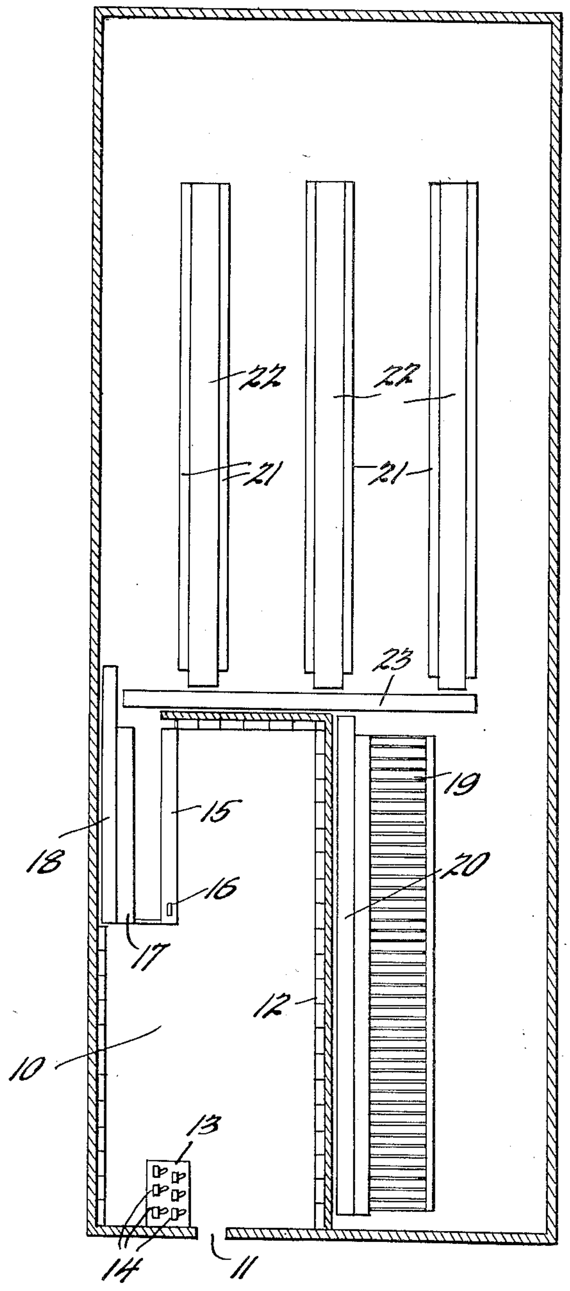

My invention relates to new and novel means to produce all or any portion of the following results:

1. Automatic or manual article listing by printing the names, prices and/or other identifying character relating to such articles, or other characters.
2. Automatic addition at selling price.
3. Automatic addition at cost price.
4. Automatic count of merchandise articles.
5. Automatic dispensing of merchanidse articles.

The principal devices of my invention include:

1. A device for printing the name and price of an article and simultaneously punching one or more holes in a strip of paper or, alternatively, a device for printing the name and price of an article and simultaneously printing one or more dots or other characterters on a strip of paper for photo electric cell operation. Each of these devices is sometimes herein referred to as a "listing machine," a "listing key," a "shopping key," and in more abbreviated form as a "key."
2. Preset pins, suitably mounted, to coact with the listing key for punching holes in a paper strip or in other material for a like purpose or, alternatively, preset type suitably mounted to coact with a listing key for printing dots or other characters on a paper strip or other substance to cause photo electric cell operation.
3. Means to coact so as to cause the printing means to act on the strip of paper carried by the key.
4. Automatic merchandise dispensers.
5. Automatic counting means.
6. A machine provided with an assembly of photo electric cells and/or electrical contacts, relays, etc. which is sometimes herein called a "contact machine" and sometimes otherwise. This machine, when not equipped with photo electric cells, receives the said perforated paper strip or other material and when so equipped receives the paper on which dots or other characters have been printed for photo electric cell operation, and by means of said perforations or printed dots, thereby operating electric circuit making and breaking devices to produce any portion or all of the results above enumerated, depending upon what kind and what number of the other devices herein described are in circuit therewith.

The principal object of my invention is to produce as many automatic operations as possible for the purchase and assembling of merchandise articles and to have it adaptable for limited operations as herein described. Each of the devices forming parts of my invention is believed to be novel and new per se, for the functions to be performed thereby and therefore I do not limit myself to claims for combinations of said devices.

Another object of said invention is to provide a price schedule for articles of merchandise that can be maintained accurately, eliminating thereby the human element of error in making prices by memory or otherwise in a haphazard fashion and to supply a means for such prices to be translated into addition totals automatically, thus further avoiding the human element of error in manual addition.

Another object of my invention is to provide an automatic dispensing means for assembling articles of merchandise, if desired.

An important object of my invention is to conserve manpower which with the elimination of errors as stated will produce a lower operating cost in a business, affording thereby a saving in prices to the consuming public.

It can be readily seen that my system may be adapted to many kinds of businesses in variable forms. It is particularly adaptable to a retail food store for use in its entirety. A wholesale house, a mail order company or other businesses might desire only the listing feature of my invention, with automatic addition and/or count of articles sold. Therefore, I do not limit myself to the proposition that one who uses less than every feature of my invention is therefore not within the scope of my invention.

One particular kind of store to which my invention is adaptable is one that would carry no stock of merchandise on hand for immediate delivery at the time of purchase or only a partial stock. This type would be a sample or display store. The samples could be actual merchandise, or illustrations of articles of merchandise such as shown in mail order catalogues or otherwise, together with printed descriptions and the price. Such a store would be equipped with my listing devices and, if desired, with means for automatic addition but it would not be equipped with my automatic merchandise dispensers as this kind of a store contemplates a number of such sample or display stores, the customers' orders from which would be filled at a central warehouse either manually or automatically and then delivered to the sample store or elsewhere as desired. It is my purpose to supply such part of my devices or all of them as required in each case to accomplish the results desired.

Some stores make it a practice to mark a price on most of the articles on display. If there is a change in price of an article, a new price has to be marked on it and the previous price obliterated. This method requires much labor and the human element of error is ever present. My system does away entirely with such labor and the possible errors therein.

The customer of a conventional food store gets as a receipt for items purchased a list of figures without names of articles to identify the prices charged, whereas with my system a customer has a printed list by name and price of each article purchased and also the number of ration points due for an article. My system provides means for printing in varied colors of ink for different classes of merchandise purchased and on the same strip of paper, e. g., "red" for meat items, "green" for fresh fruits and vegetables, and "black" for regular grocery items. The benefit of this to a customer and to the store management is to be able to check all meat and other items without confusion.

If my entire system is installed, including the automatic dispensing means, the customer receives the further benefit in shopping of no basket to carry or buggy to push.

The cashier of a store operated under my system must balance cash receipts with the total of the automatic addition, thereby assuring no loss to the store in that respect.

An important object of the invention with respect to automatic dispensing of merchandise articles is to provide means as shown by my trip-shelves for dispensing such articles as meat, vegetables and other articles not satisfactorily handled by any automatic or mechanical dispensing means heretofore known.

My display system with the use of a key for purchasing can be applied to cooked foods such as are offered for sale in a cafeteria with elimination of the self-service feature requiring the shoving along of a tray in a line of others doing the same thing, as with my system no tray is needed for the customer and no particular line is required in which to move in order to make a selection. The customer may look at a display, determine its appetite appeal, see the price, the quantity that will be delivered at the price listed, use the key to make a purchase and successively repeat this action for other commodities until finished, when his list of food is handed to the cashier for its payment and the delivery thereof at a table or other space for him to eat. Thus with ease and certainty the customer has his selection of food to eat without the bother and pushing by other customers as is usually the case in a crowded cafeteria.

The novelty and newness of my invention is accentuated in that each card of the conventional prepunched card system is limited in its functions to a recording of figures relating to the same article of merchandise whereas with my system there is no limit to the number or kind of articles that can be selectively controlled in automatic succession for automatic addition and otherwise from multiple sets of pattern holes or printed dot patterns in the same strip of paper.

Another object of my invention is to use a blank strip of paper on which there are no figures, ruled lines or other marks to denote the position for any hole to be punched, or the positions of any dot to be printed, as compared with other systems that require such markings in order to locate a punched hole in correct position.

Another object of the invention is to provide a feed for the paper without the necessity of a perforated guide in the paper for such purpose.

Further, my system makes use preferably of a continuous roll of thin paper for receiving indicia adapted to cause the operation of electrical contacts and/or photo electric cells for the selections above described. A strip of this roll may be of any length to produce an operation for any or all of the said selections as compared with other systems that must use media of predetermined sizes and/or shapes and with special preparation of the material so used for a desired selection.

Another object of the invention is to provide simple means whereby an item or items of the article list may be cancelled, as by punching a hole at the correct position in each case for such cancellation and thereby rendering inoperative the selective contacts, photo electric cells, and relays for such item or items. This is to remedy any error in listing or to cancel an item for any other reason.

This invention is distinctive as a new and novel method for the automatic control of selective electrical switches in that the medium to cause the electrical contacts to function for a particular selection and result is a blank strip of paper in which either holes are punched or dots or other characters are printed in a predetermined relation by simply making use of preset pins or preset type in the operation of my listing devices as described. The most inexperienced can feed the strip through the translating machine, which is in contrast with the necessity for a trained operator to use the conventional prepunched card system of selective electrical controls.

Figure 42C:
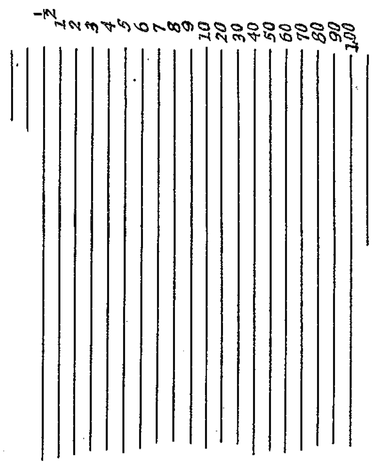
Figure 46:
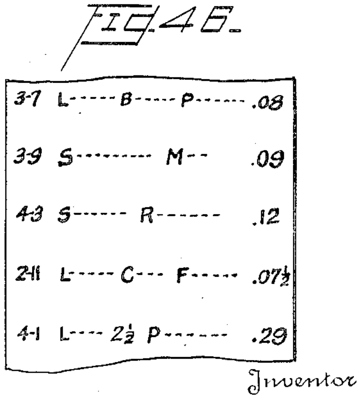
Figure 2:
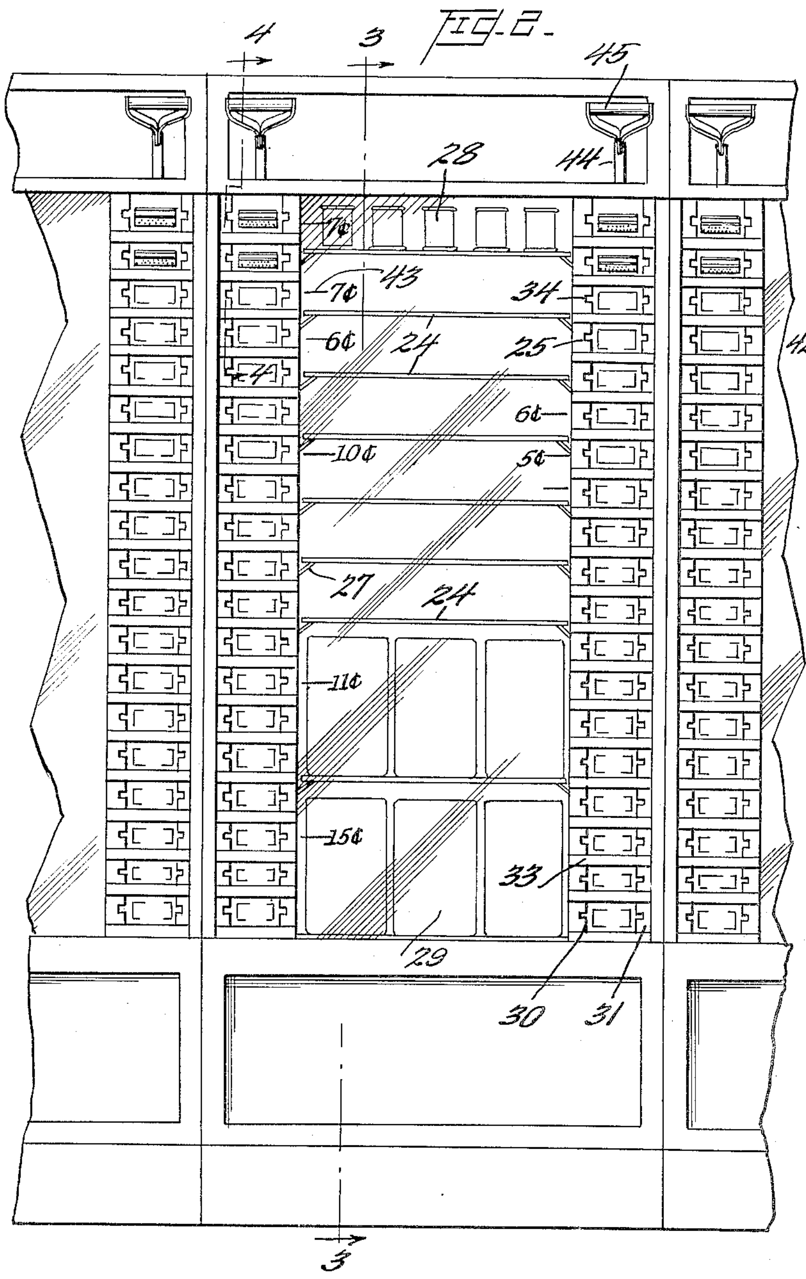
Figure 3:
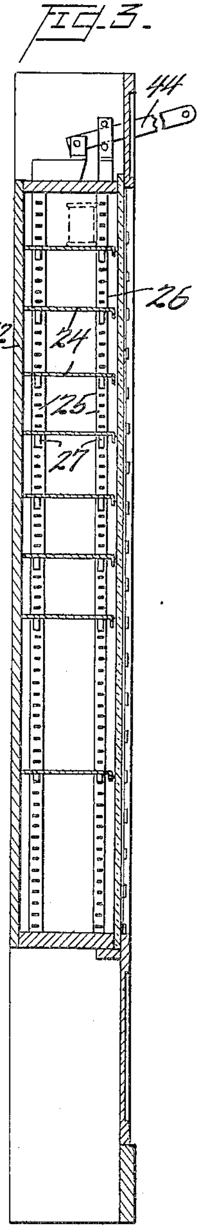
Figures 4, 5, 6, 7, 8:
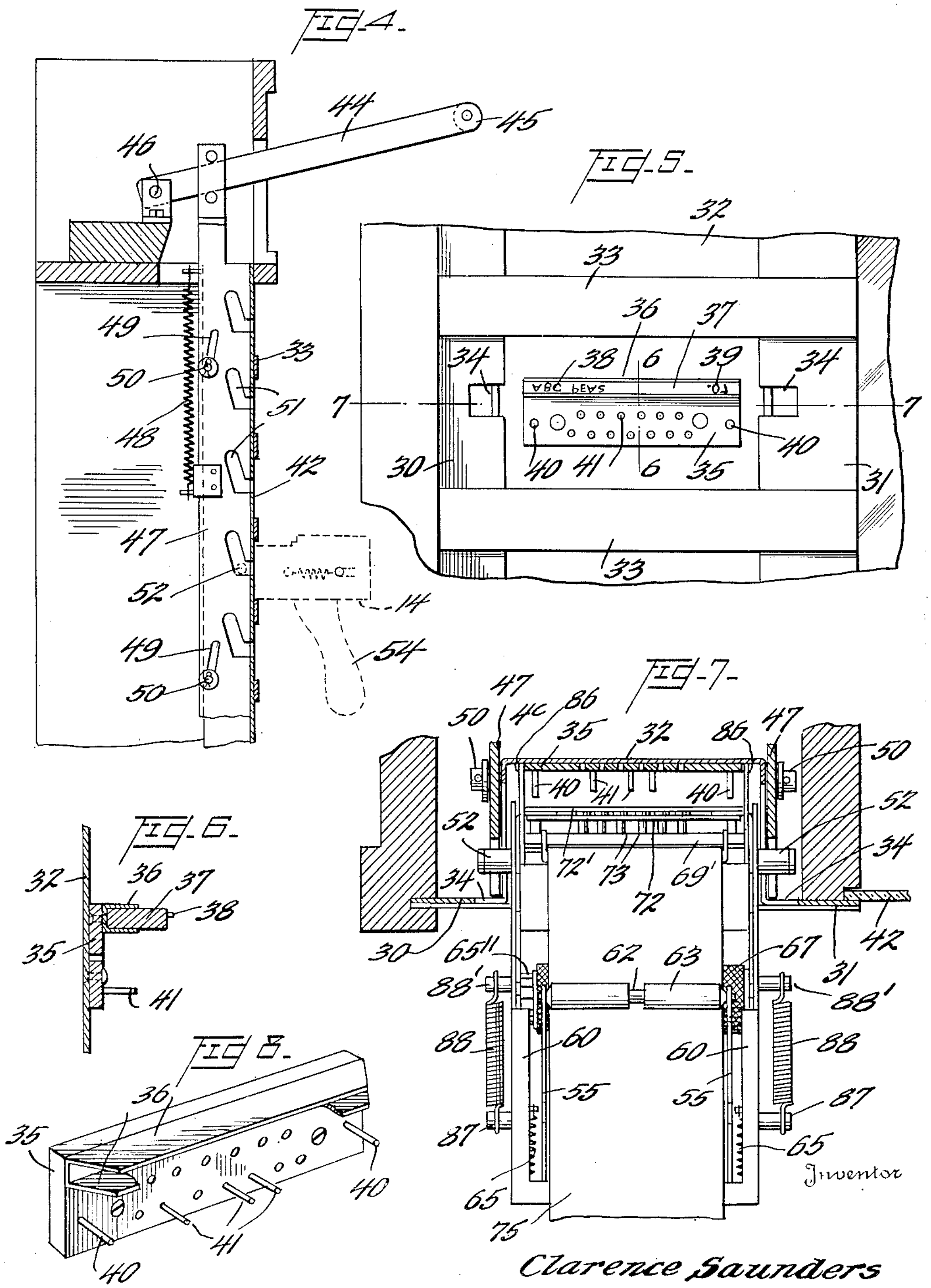
Figures 9, 10:
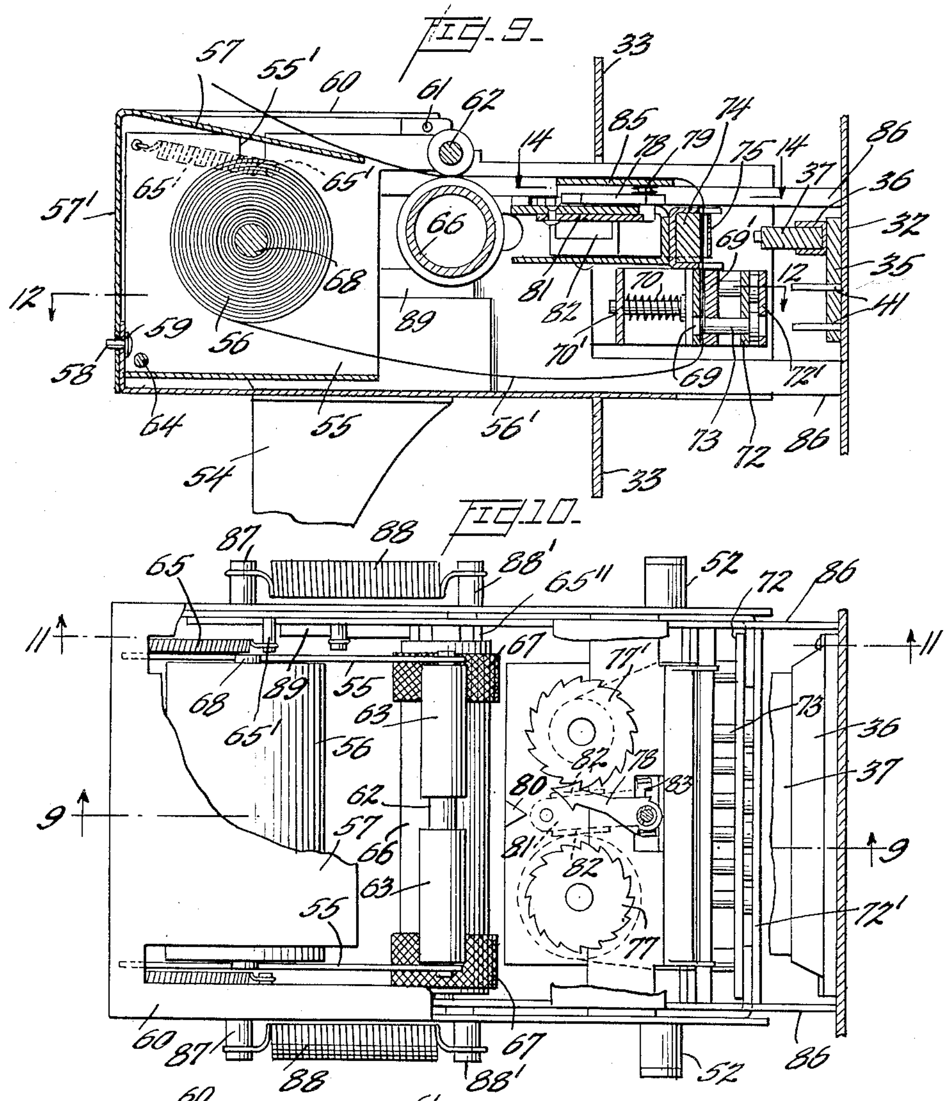
Figure 11:
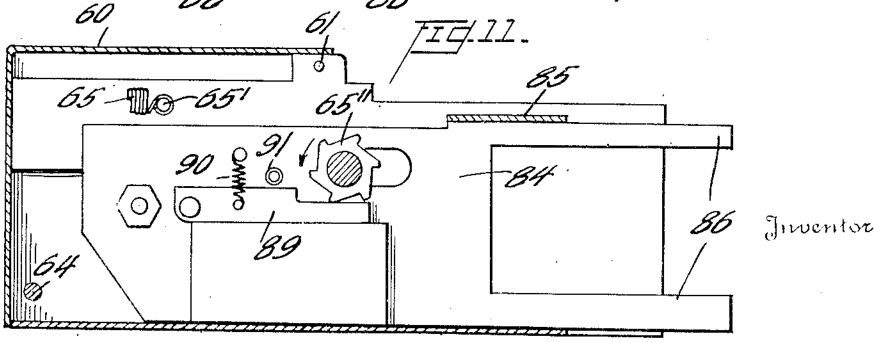
Figure 12:
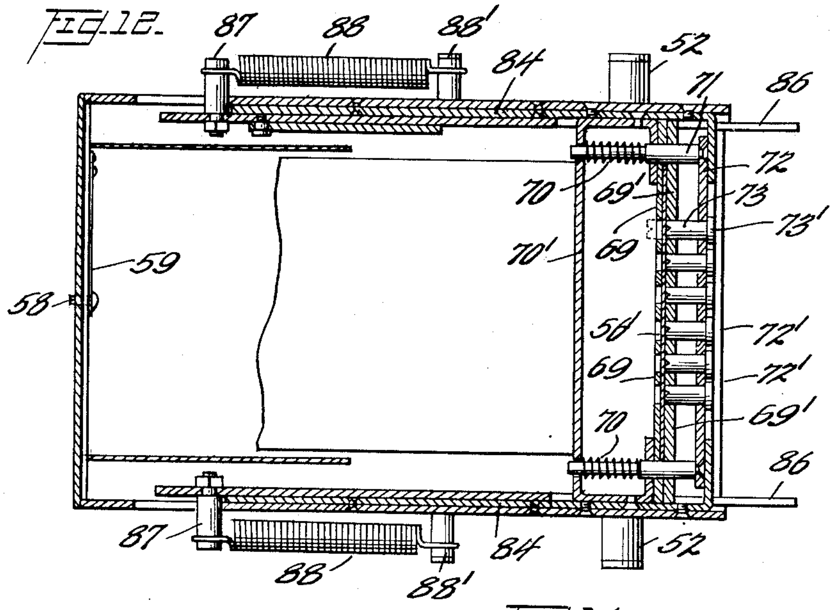
Figures 13, 14:
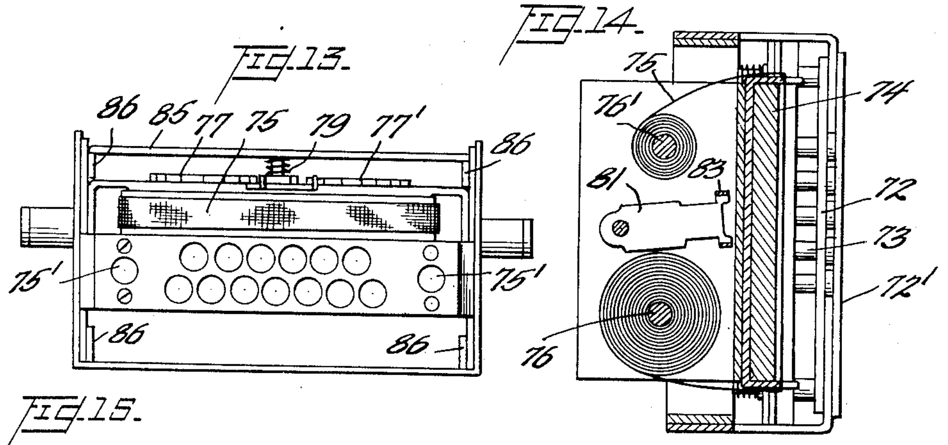
Figure 15:
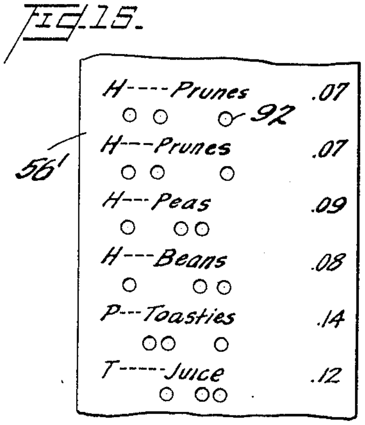
Figure 16:
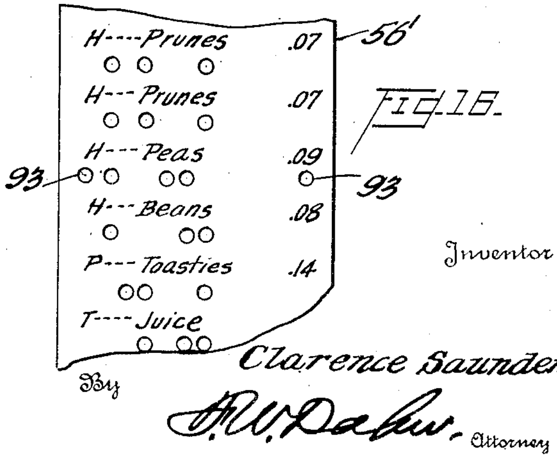
Figures 17, 18, 19, 20, 21:
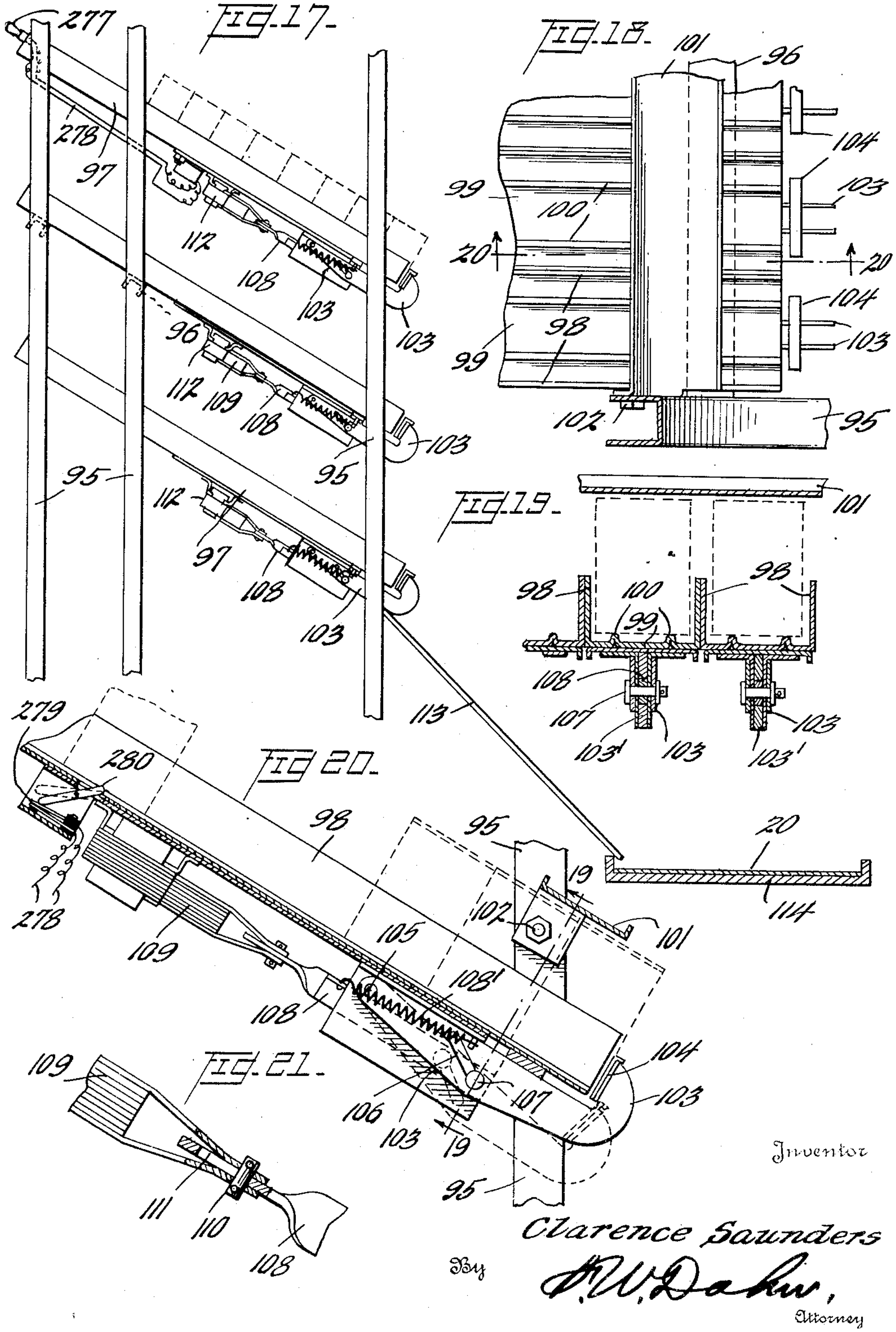
Figure 22:
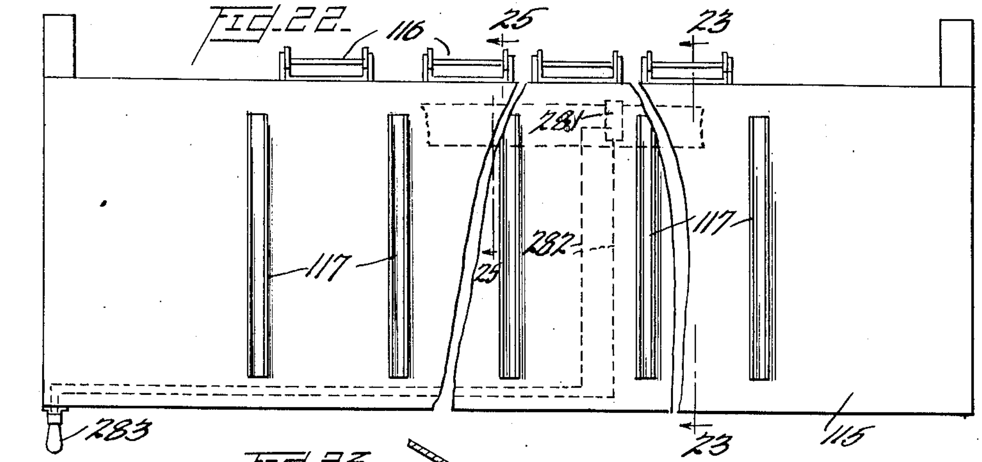
Figures 23, 24, 25, 26, 27:
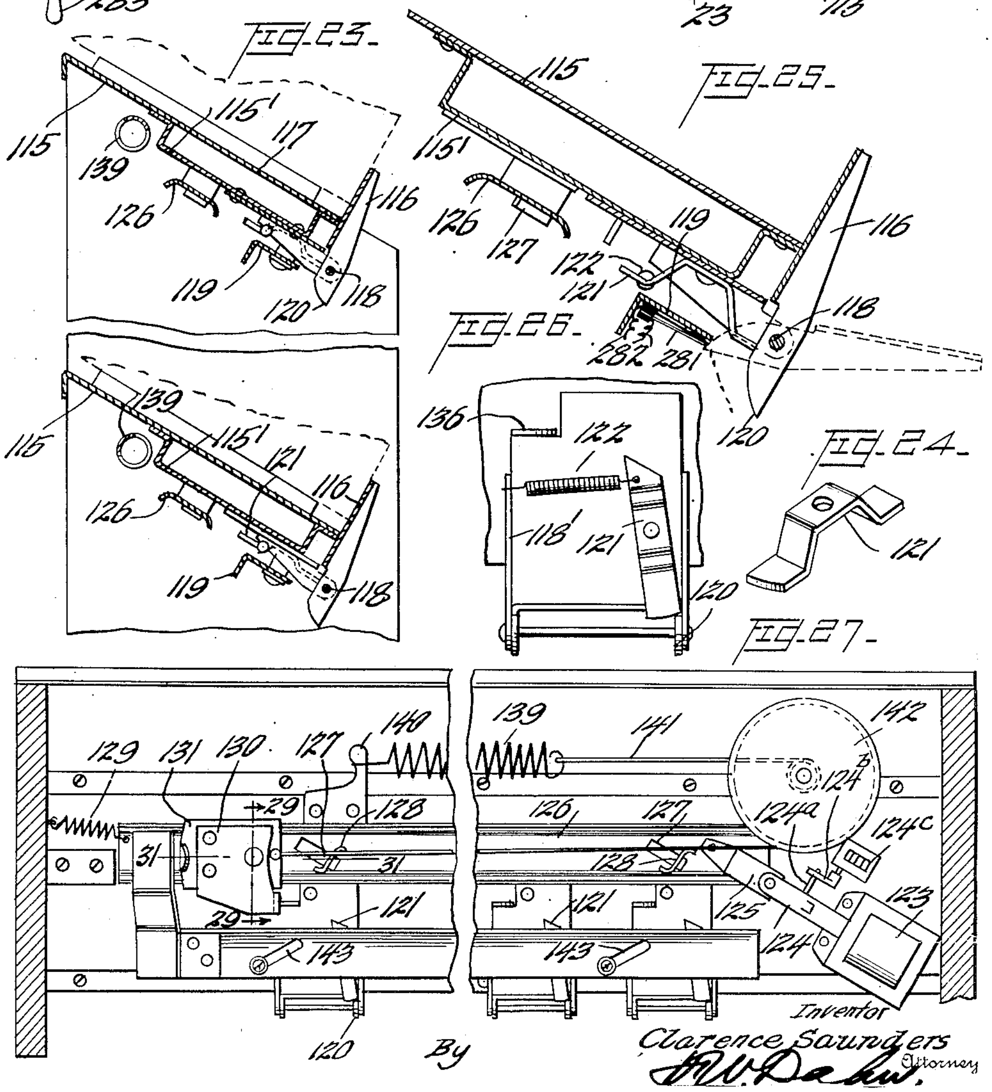
Figures 28, 29, 29A, 30, 31:
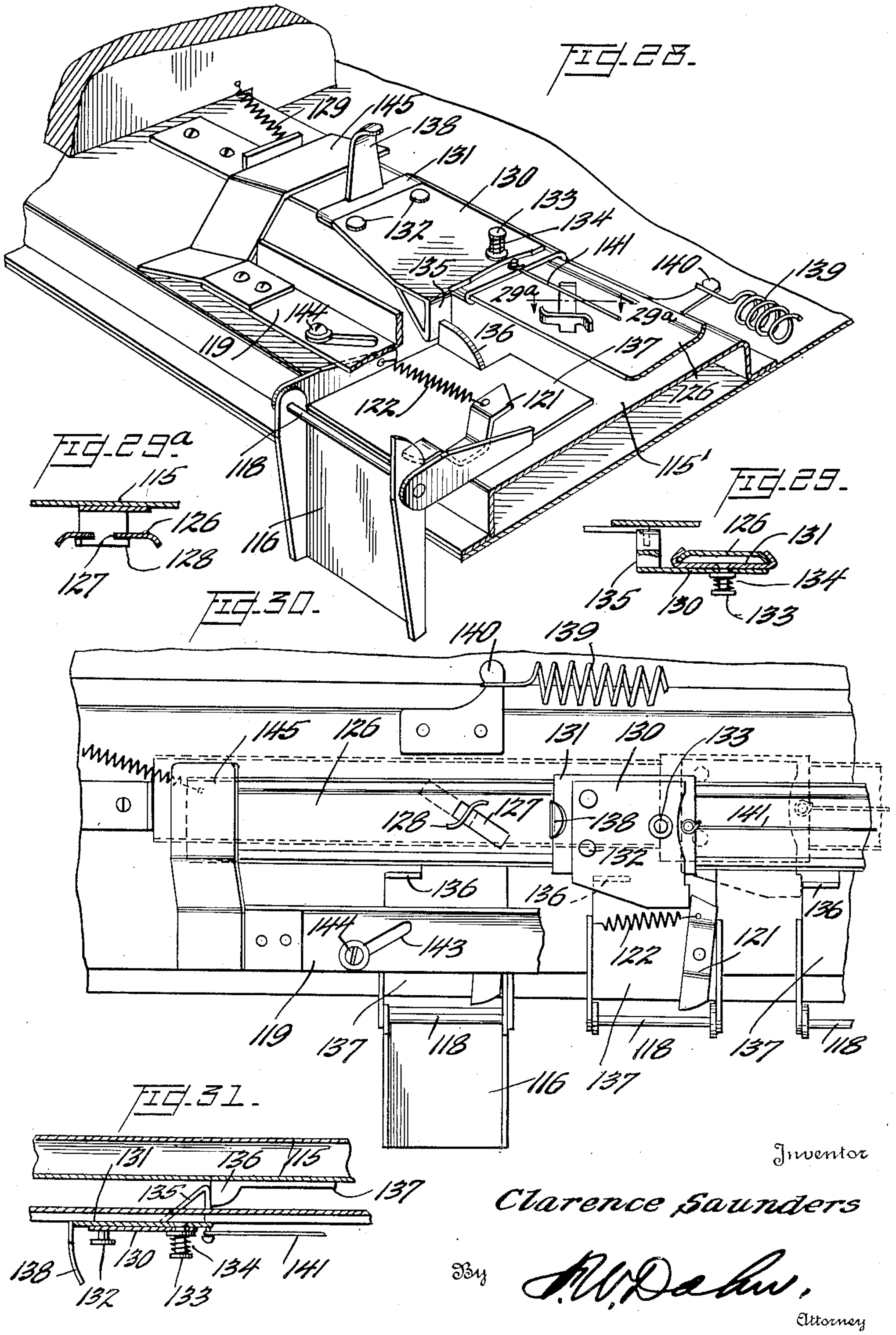
Figure 32:
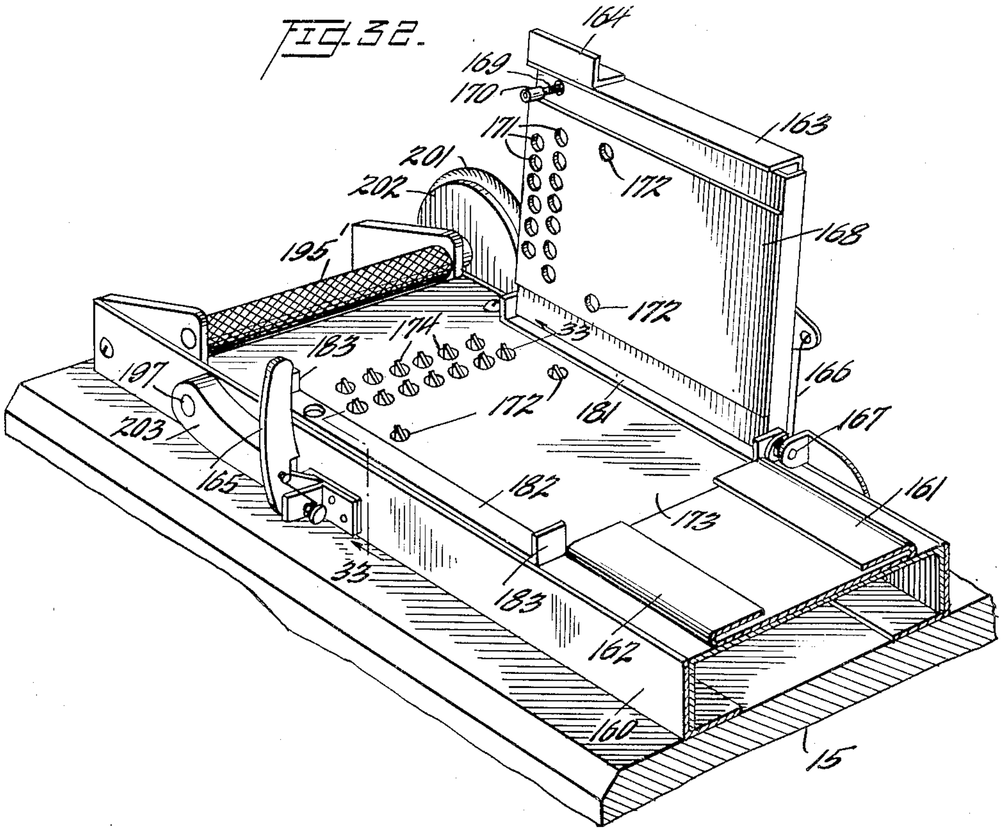
Figure 33:
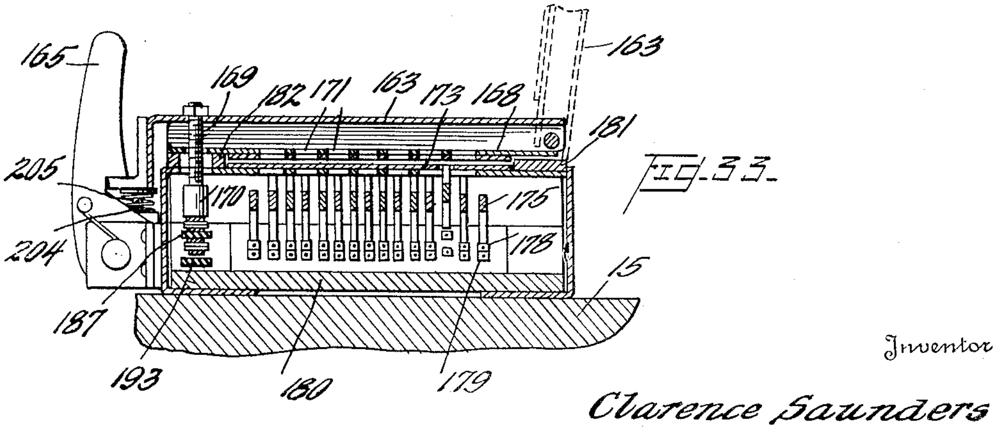
Figure 34:
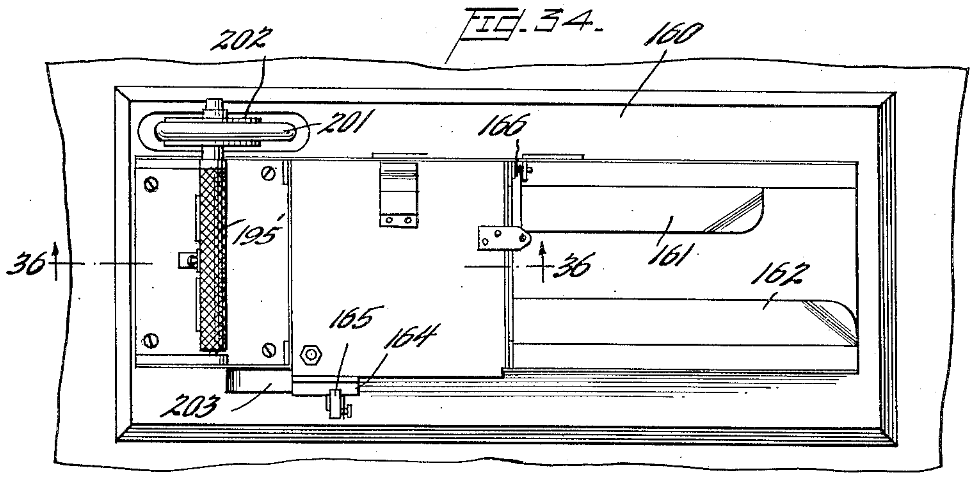
Figure 35:
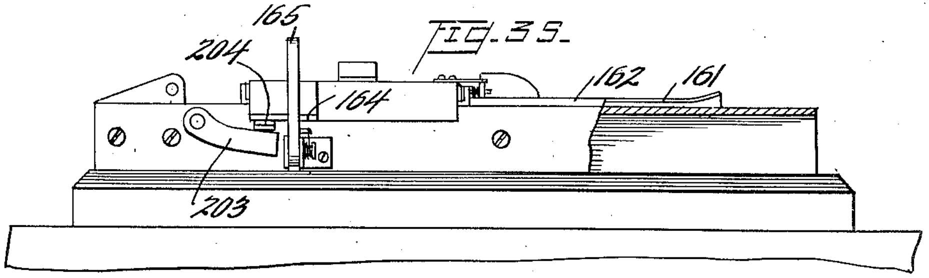
Figures 36, 37:
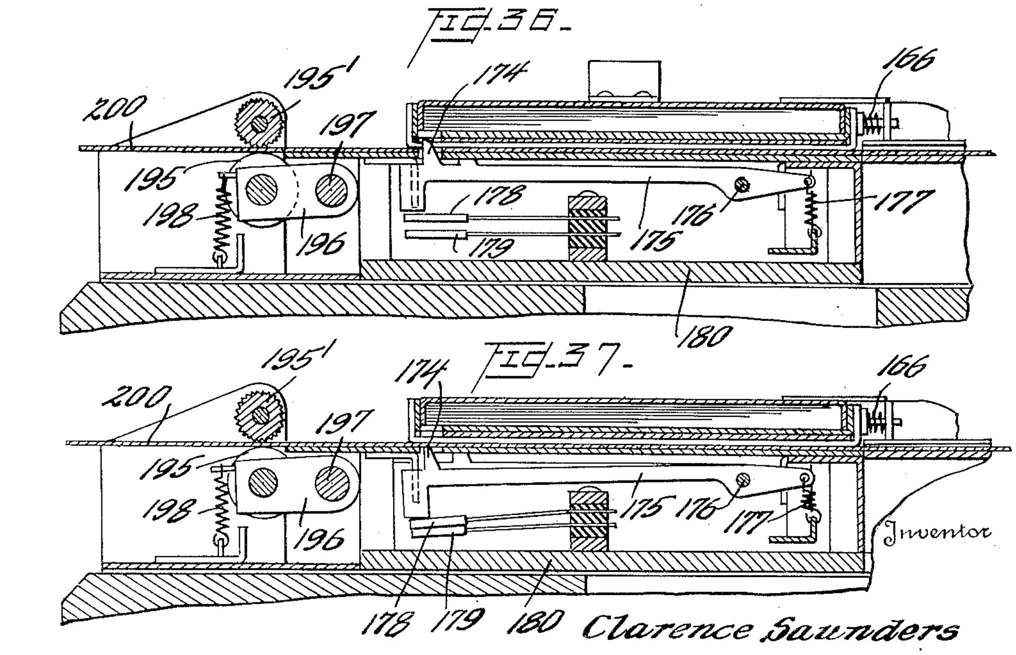
Figure 38:
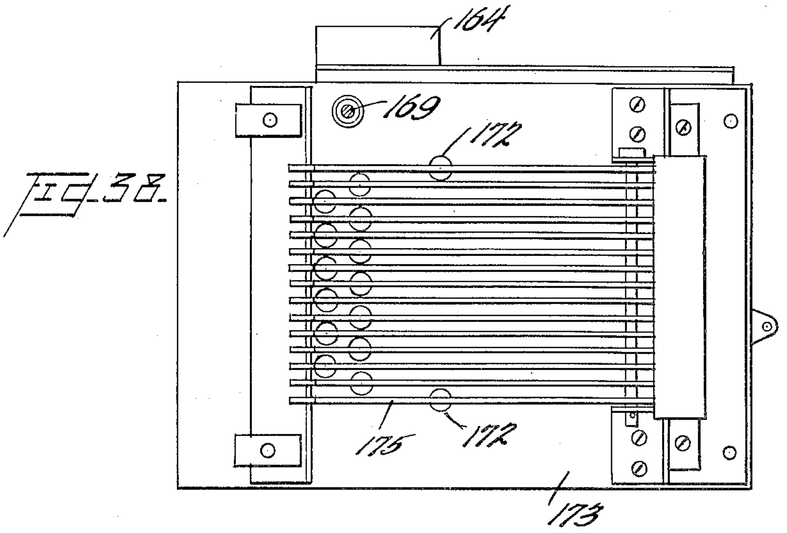
Figure 39:
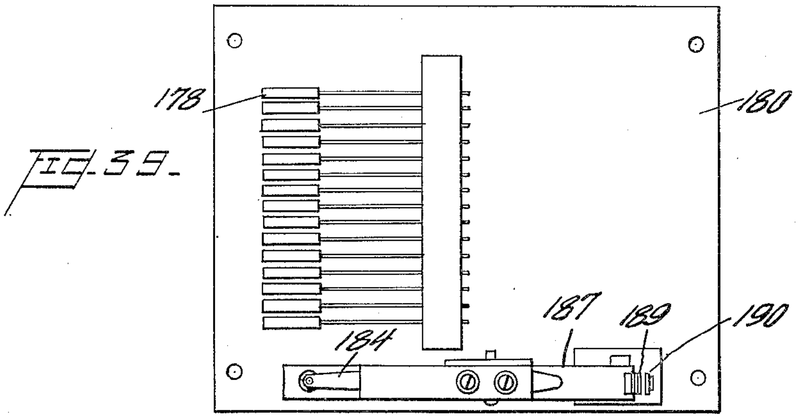
Figures 40, 41:
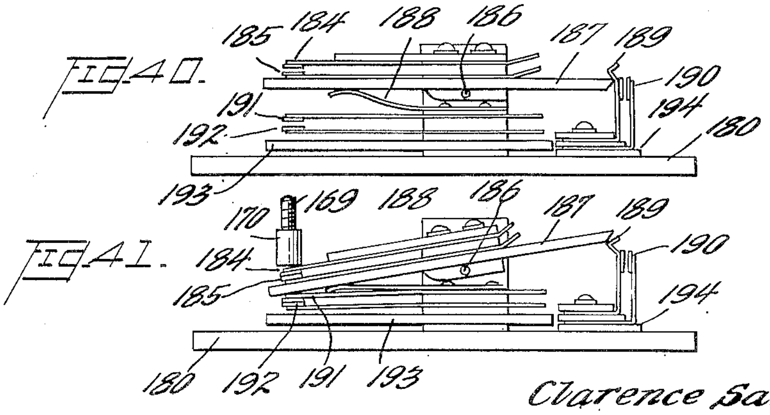
Figure 42A:
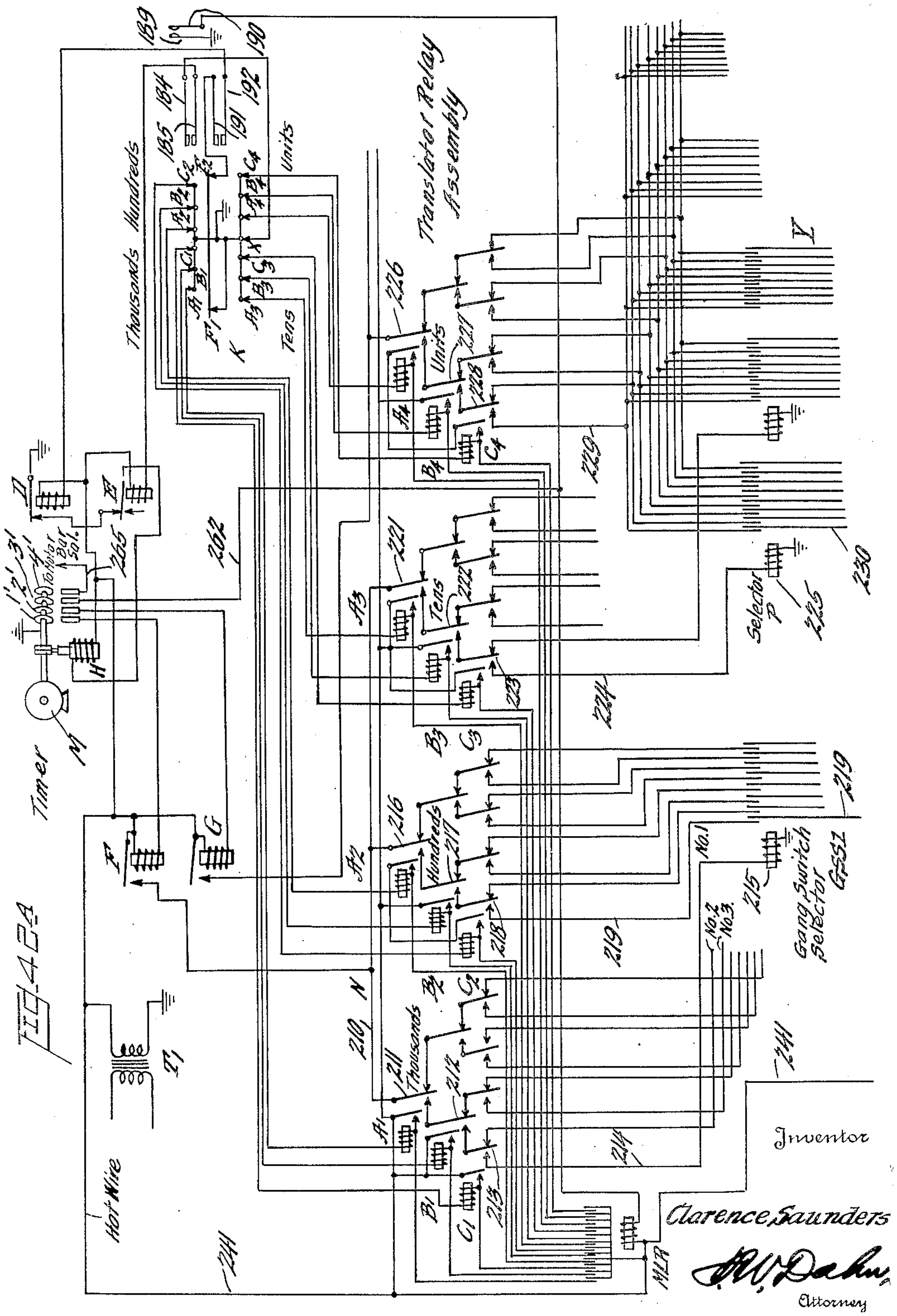
Figure 42B:
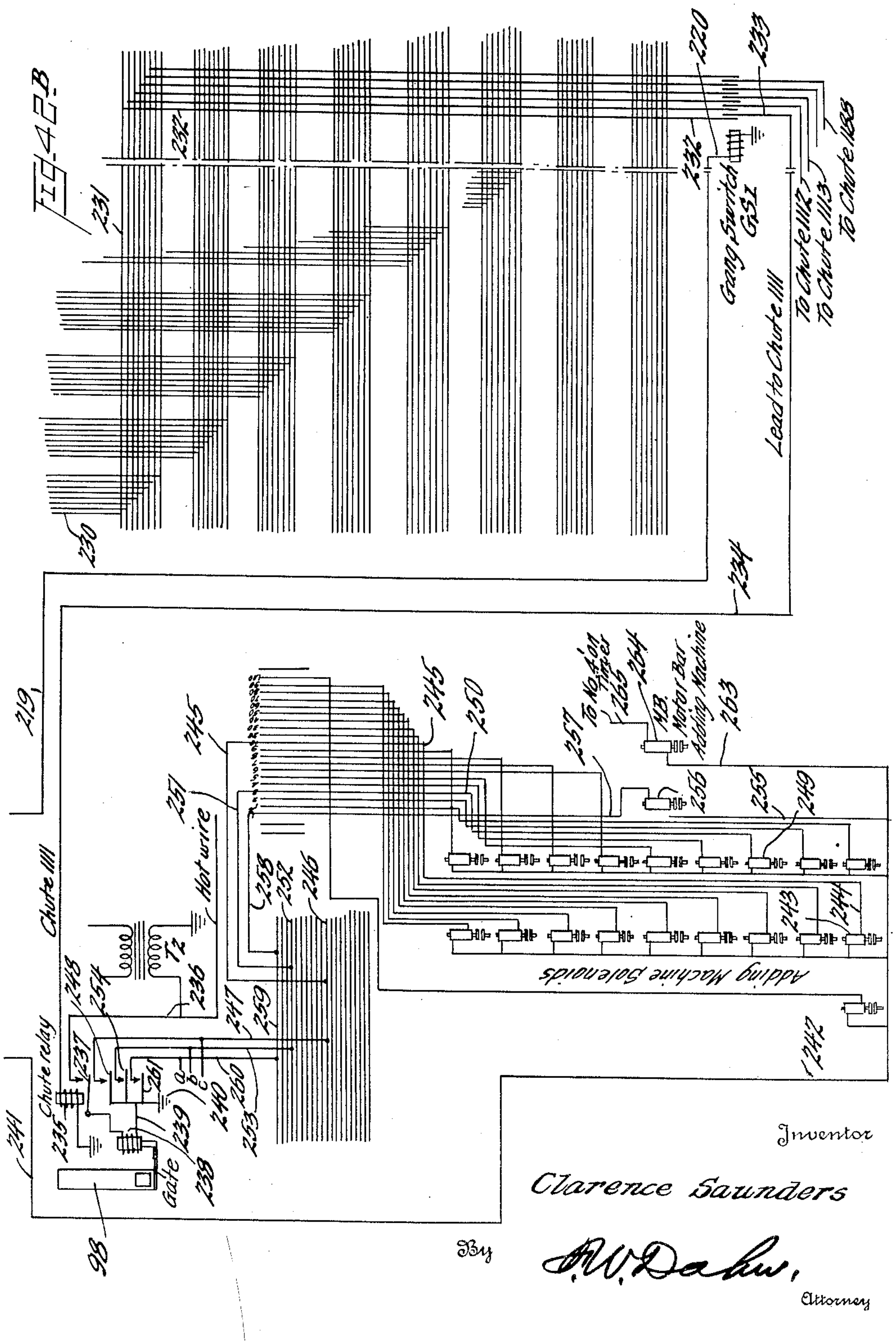
Figure 43:
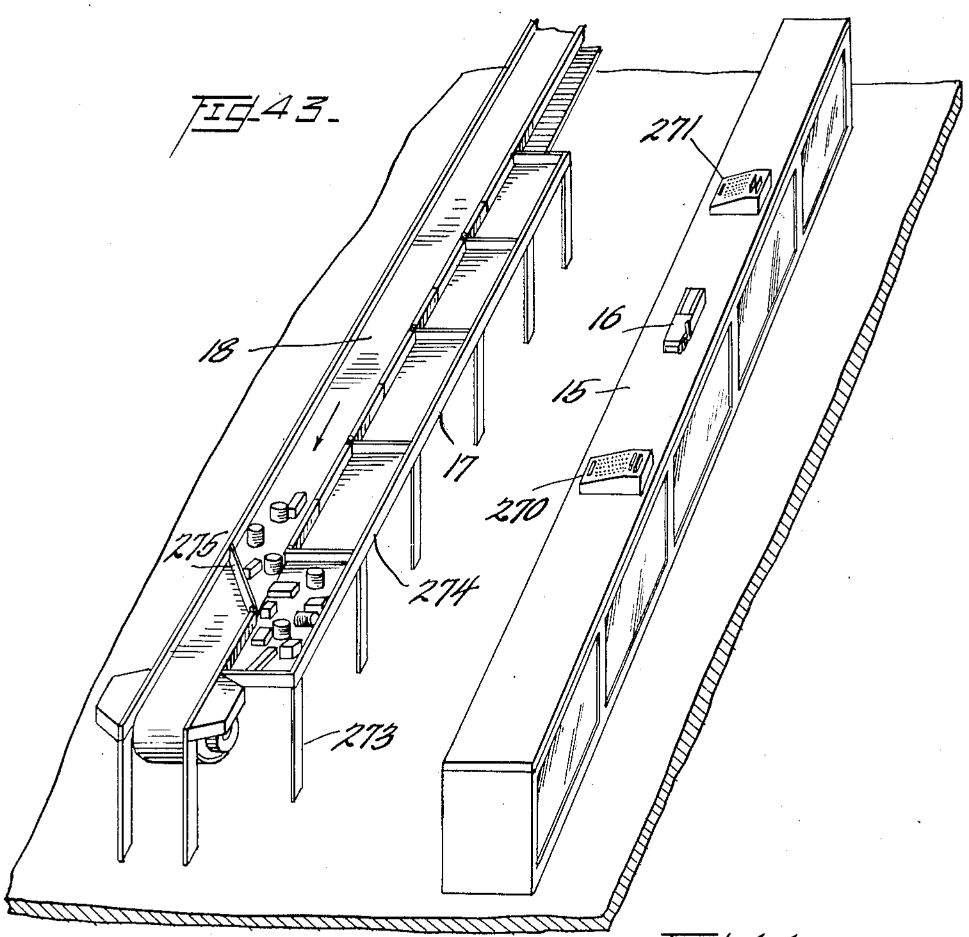
Figure 44:
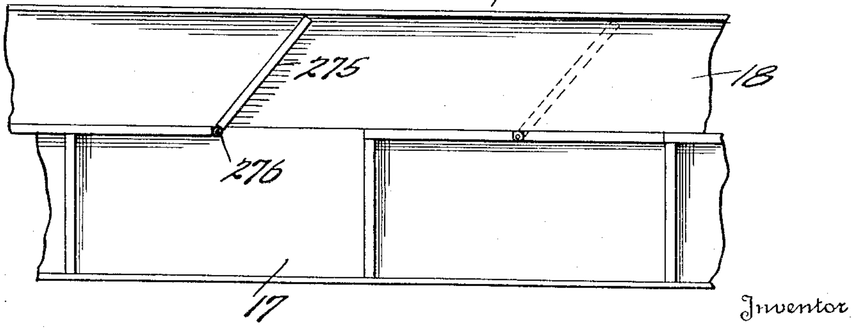
Figure 45:
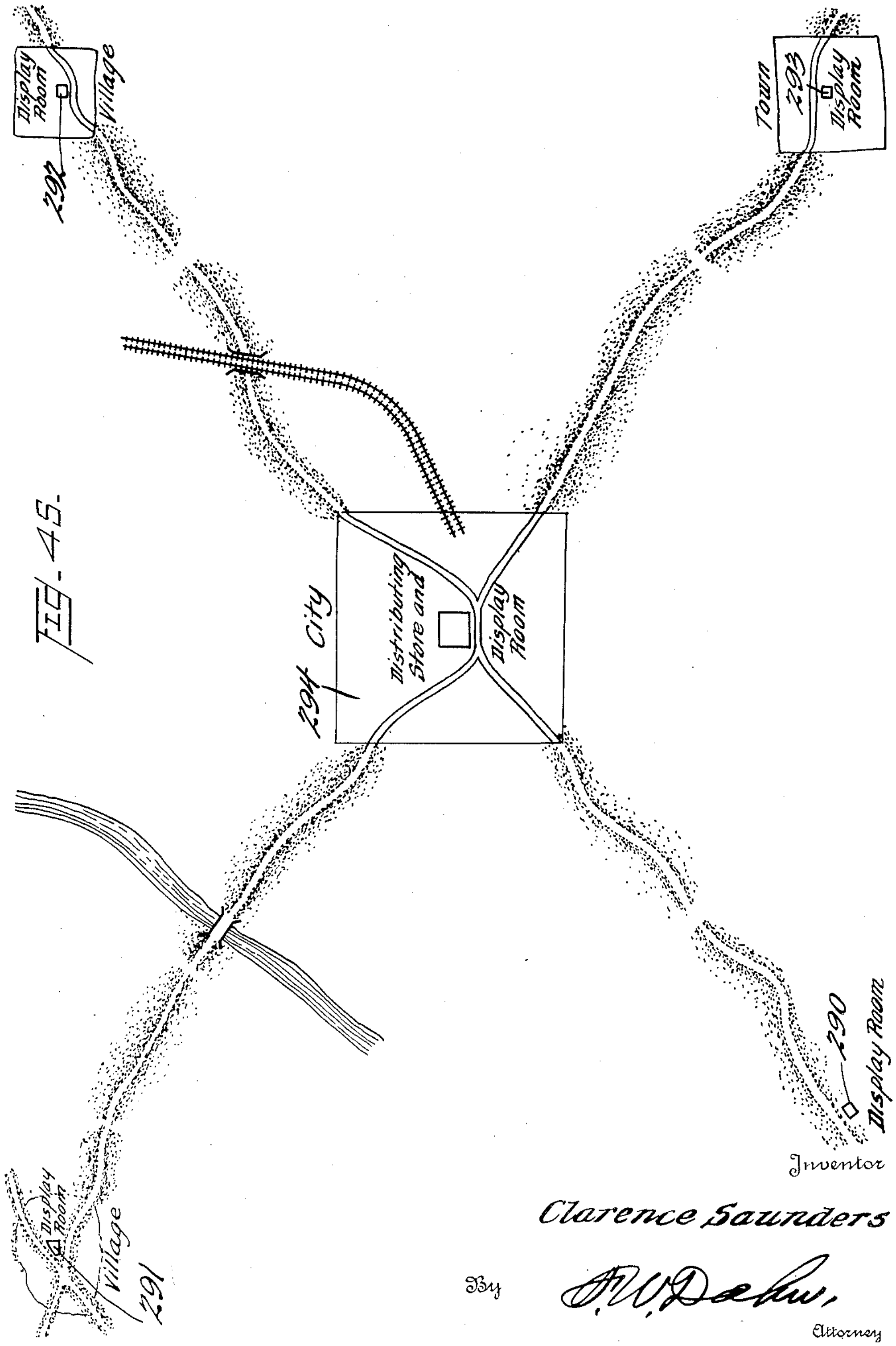

Referring to the drawings, which are made a part of this application, and in which similar reference characters indicate similar parts:

Fig. 1 is a top plan of the interior of one form which a store may take when arranged in accordance with my invention, Fig. 2, a front elevation of a portion of the display room of the store, Fig. 3, a vertical section on line 3—3 of Fig. 2, Fig. 4, a vertical section on line 4—4 of Fig. 2, Fig. 5, a front elevation, on an enlarged scale, of a portion of Fig. 2, Fig. 6, a vertical section on line 6—6 of Fig. 5, Fig. 7, a horizontal section on line 7—7 of Fig. 5, showing in part a shopping key in position to be operated, Fig. 8, a perspective of parts shown in Fig. 5, Fig. 9, a central longitudinal section of the shopping or listing key on line 9—9 of Fig. 10, Fig. 10, a top plan of the key, with parts broken away to show the interior construction, Fig. 11, a longitudinal section, showing paper feeding means, on line 11—11 of Fig. 10, Fig. 12, a horizontal section on line 12—12 of Fig. 9, looking upward, Fig. 13, a front elevation of the key, Fig. 14, a horizontal section of the front portion of the key on line 14—14 of Fig. 9, showing an ink ribbon and means for feeding it, Figs. 15 and 16, elevations of strips with indicia thereon, Fig. 17, a side elevation of a chute structure and coacting means, partly in section, Fig. 18, a partial top plan of the same, viewed in the direction of the arrow in Fig. 17, Fig. 19, a vertical section on line 19—19 of Fig. 20, Fig. 20, a vertical section on line 20—20 of Fig. 18, showing the chute structure of Fig. 17 on an enlarged scale, Fig. 21, a detail of parts in Fig. 20 partly in section, Fig. 22, a plan of a trip shelf forming part of my invention, Fig. 23, a partial longitudinal section on line 23—23 of Fig. 22, Fig. 24, a perspective of the gate releasing latch, Fig. 25, a section on line 25—25 of Fig. 22 showing two positions of the gate, Fig. 26, a partial bottom plan of the trip shelf, enlarged to show the gate, releasing latch and associated parts, Fig. 27, a bottom plan of the trip shelf, Fig. 28, a bottom perspective of a portion of the trip shelf, showing the resetting mechanism, Fig. 29, a detail section of parts shown in Fig. 28, on line 29—29 of Fig. 27, Fig. 29a, a section on line 29a—29a of Fig. 28, Fig. 30, a partial bottom plan, showing a gate released and the releasing mechanism in position to release the latch of the next gate, Fig. 31, a section on line 31—31 of Fig. 27, Fig. 32, a perspective of a contact machine forming part of my invention, with the lid raised, Fig. 33, a vertical transverse section of the same approximately on line 33—33 of Fig. 32, with the lid closed, Fig. 34, a top plan of the same, Fig. 35, a side elevation viewed from the front of Fig. 32, partly broken away, Fig. 36, a longitudinal section of the contact machine, on line 36—36 of Fig. 34, Fig. 37, a similar view, with certain contacts in closed position, Fig. 38, a bottom plan of the top plate of casing of the contact machine, showing the contact operating parts, Fig. 39, a top plan of the bottom plate of the machine, showing the series of contacts and an associated switch, Fig. 40, a side elevation of switch mechanism at the front of the contact machine, showing it in open position, Fig. 41, a similar view with the switch in closed position, Figs. 42A and 42B, jointly, a wiring diagram, Fig. 42C (Sheet 1), a detail of the wiring diagram, on an enlarged scale, Fig. 43, a perspective of parts at the cashier's and packer's station, Fig. 44, a plan of a portion of the packer's station, Fig. 45, a geographic layout, illustrating a proposed method of use of the invention, Fig. 46, an elevation of another form of strip.

Figure 47:
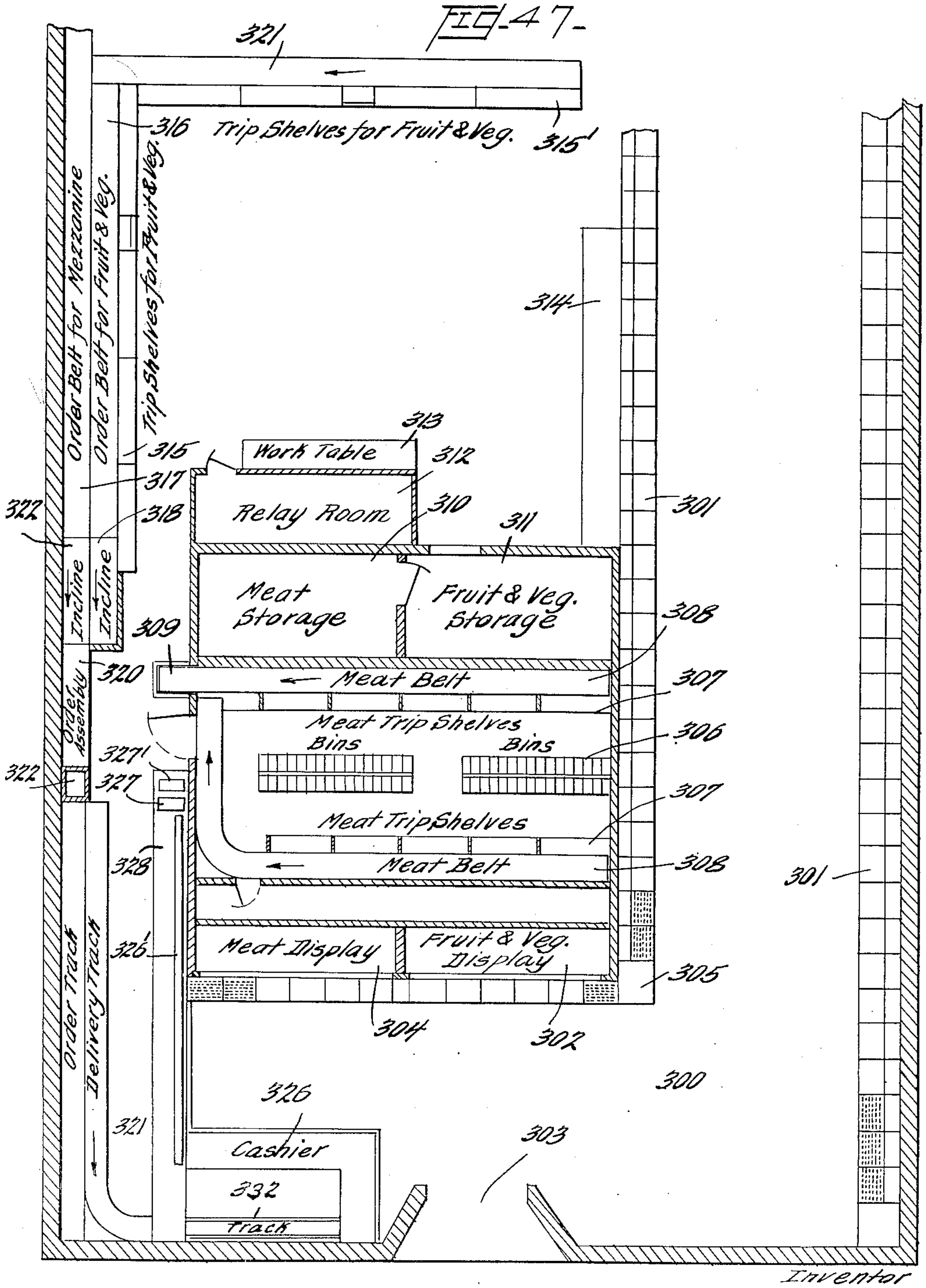
Figure 48:
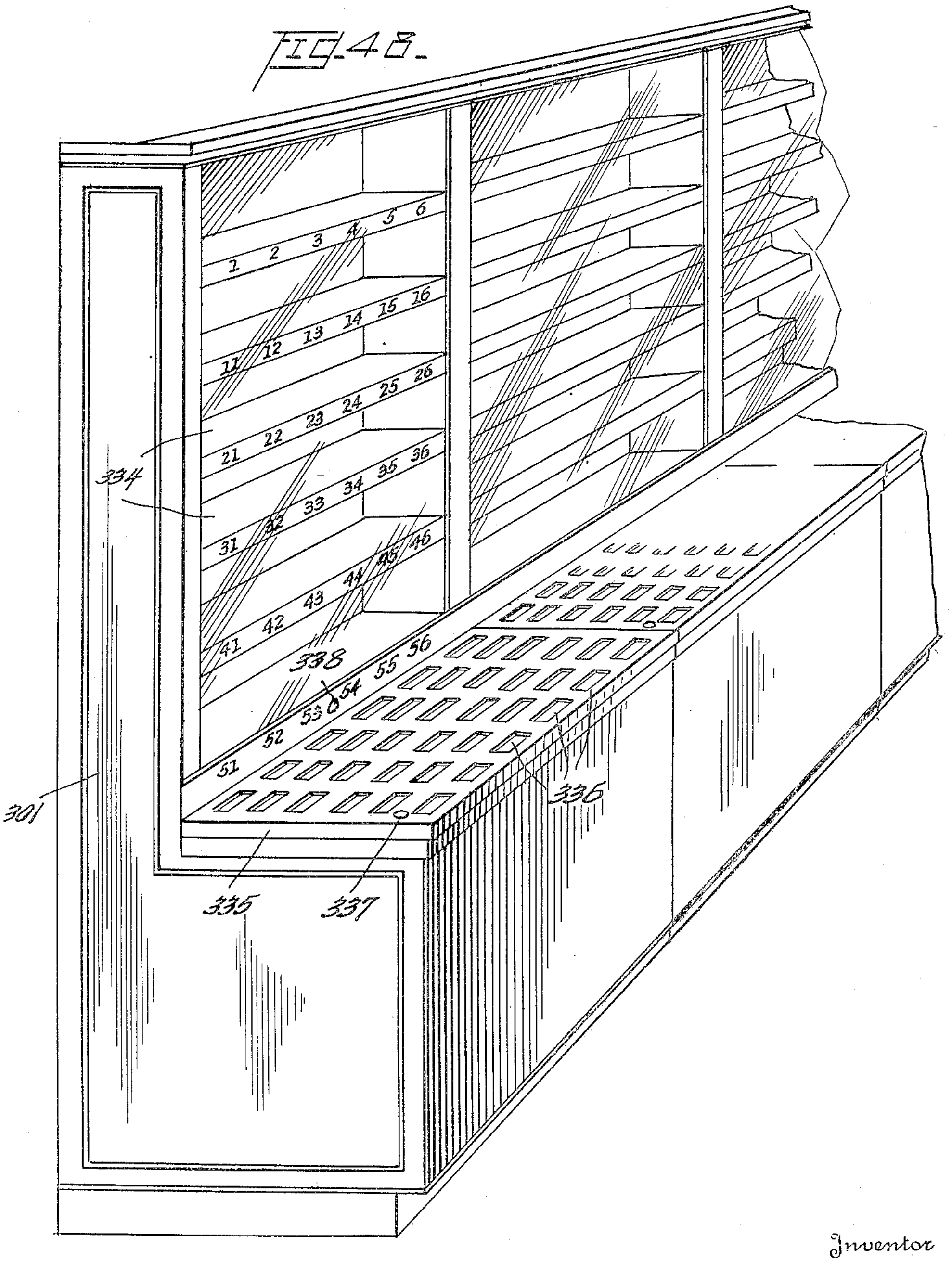
Figure 49:
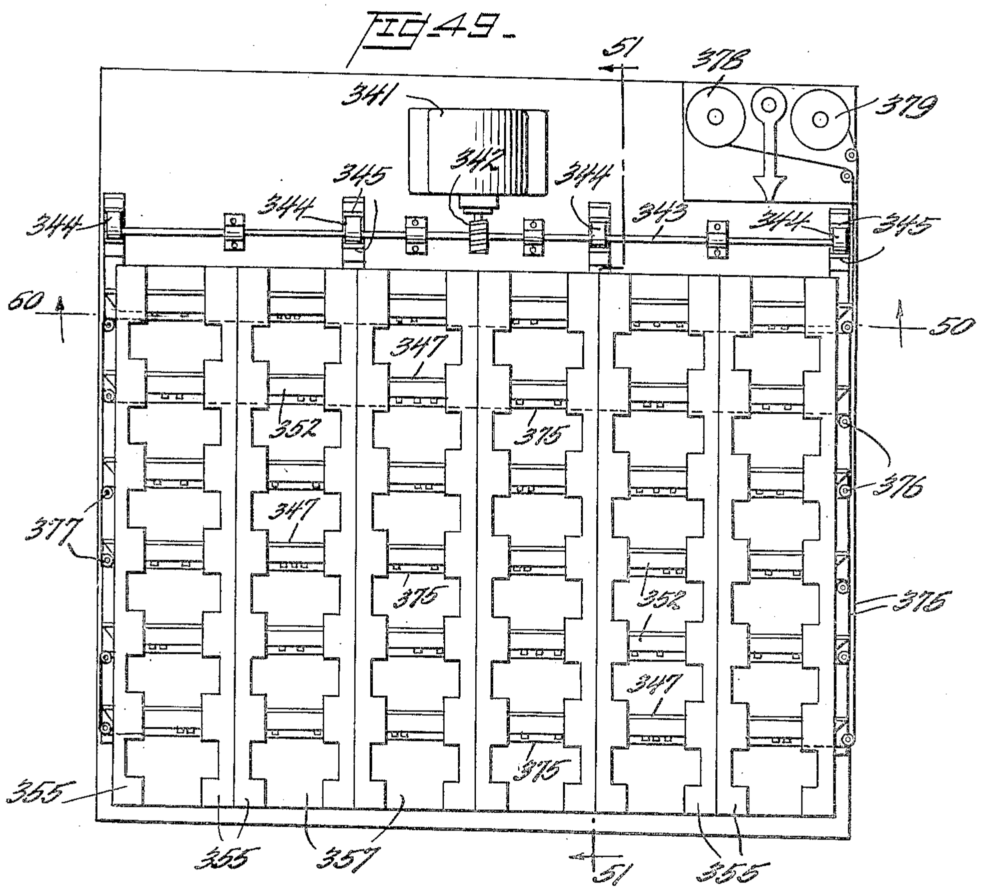
Figure 50:
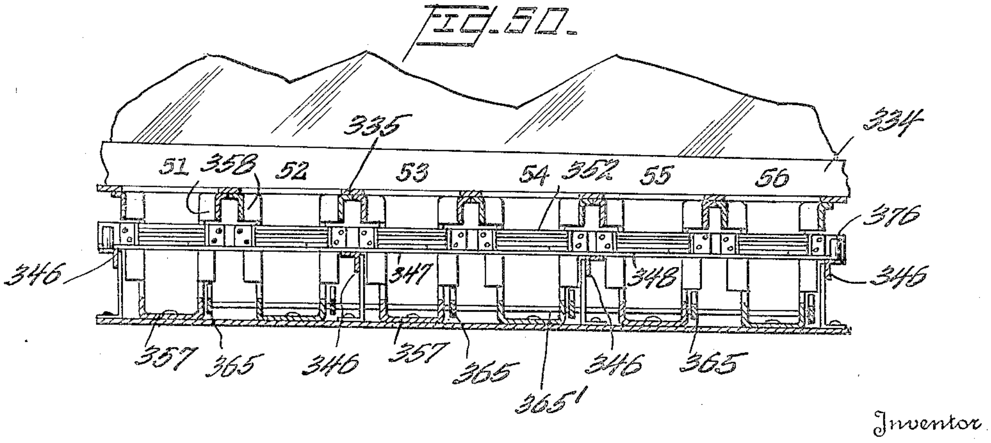
Figure 51:
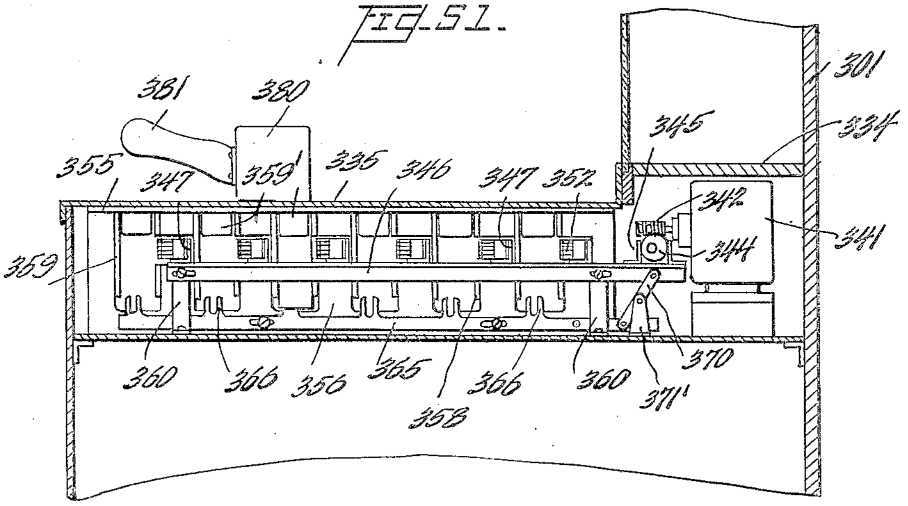
Figures 52, 53:
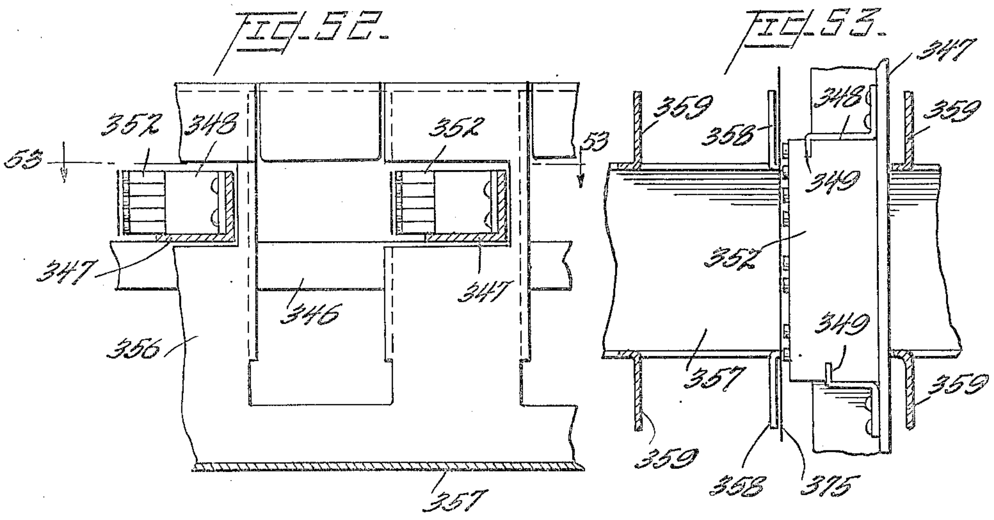
Figure 54:
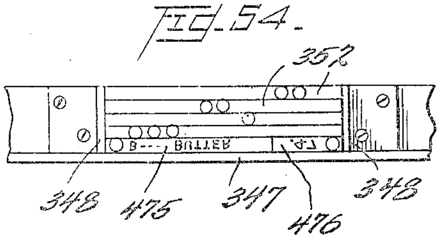
Figure 55:
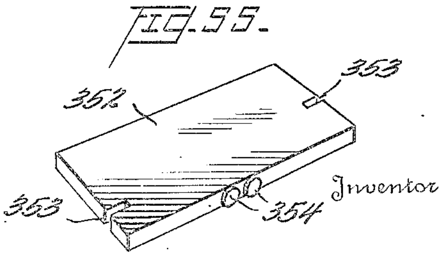
Figure 51A:
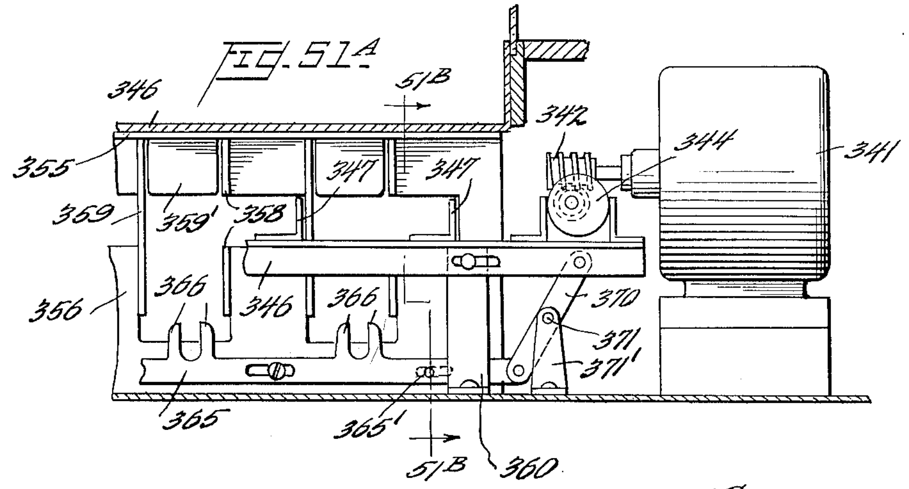
Figures 51B, 51C, 51D:
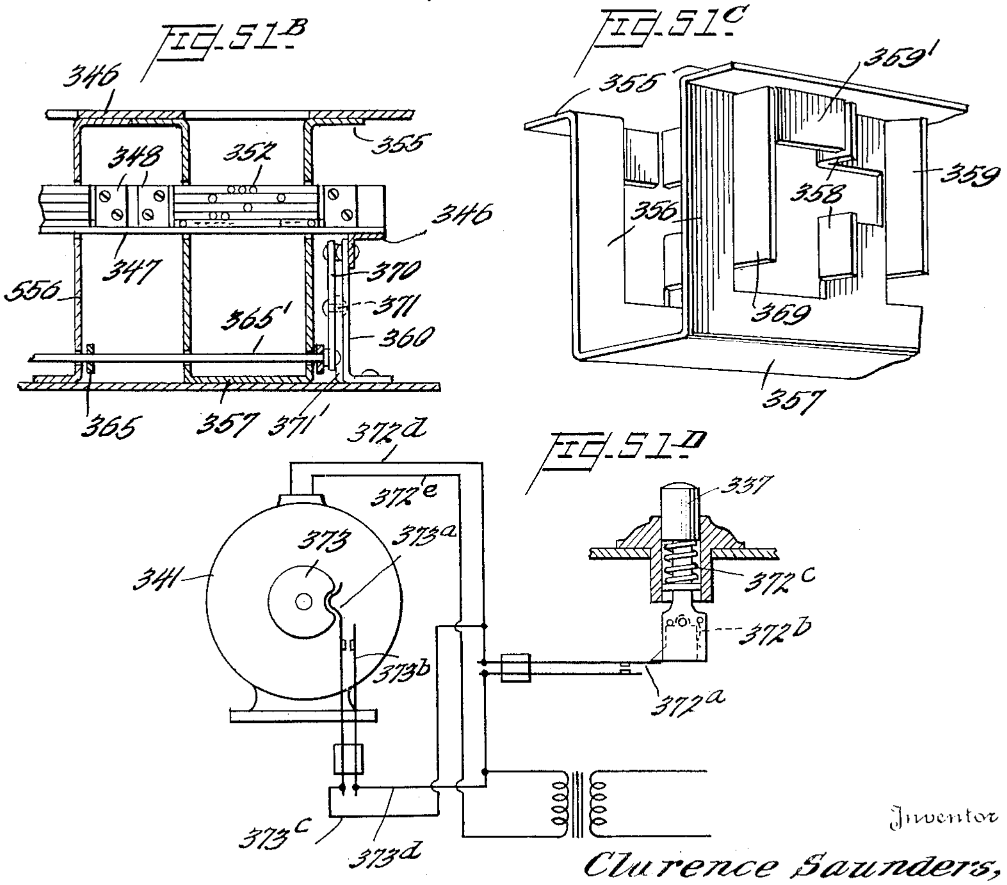
Figures 56, 57, 58, 59, 60, 61, 62:
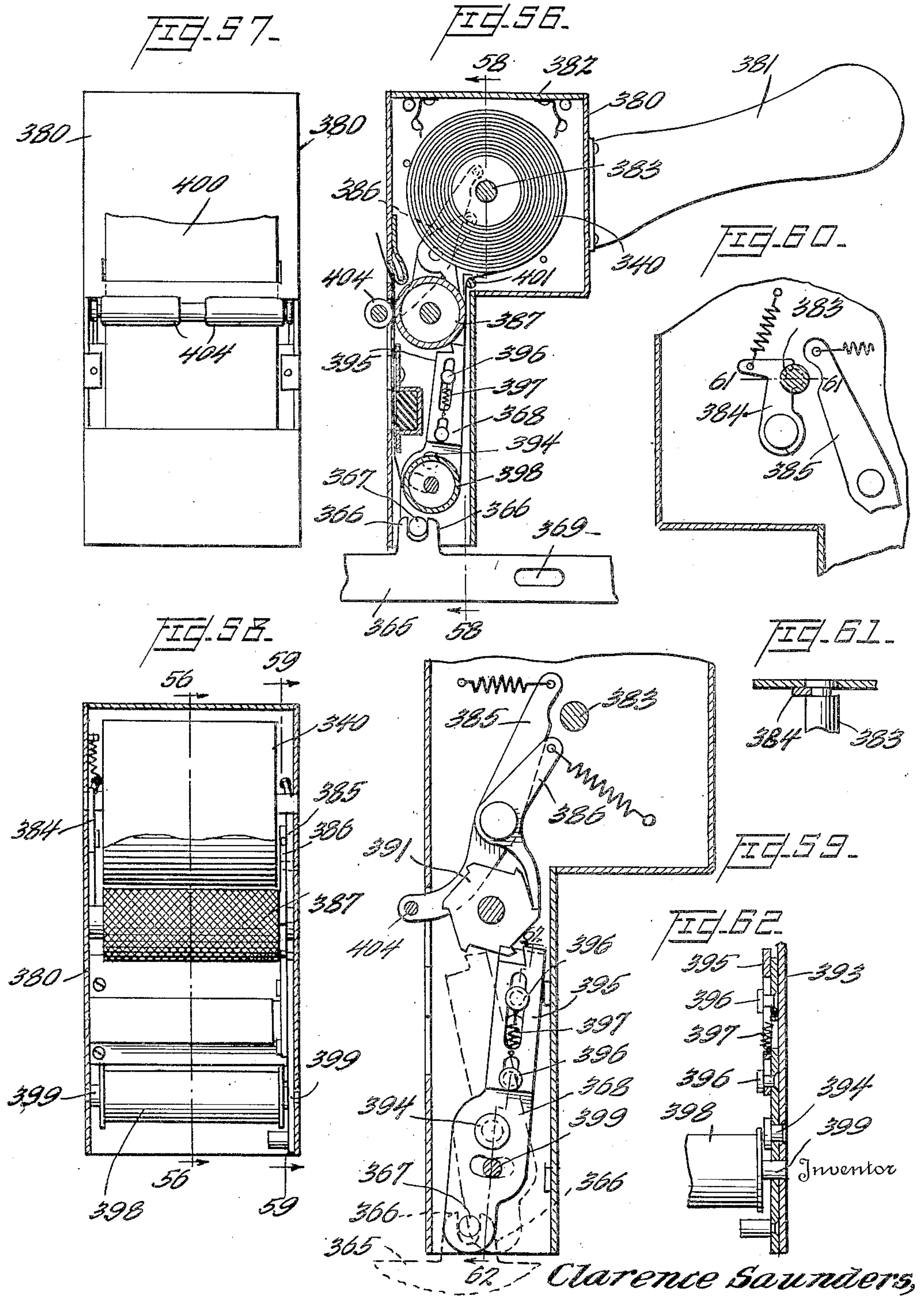
Figures 63, 64, 65, 66:
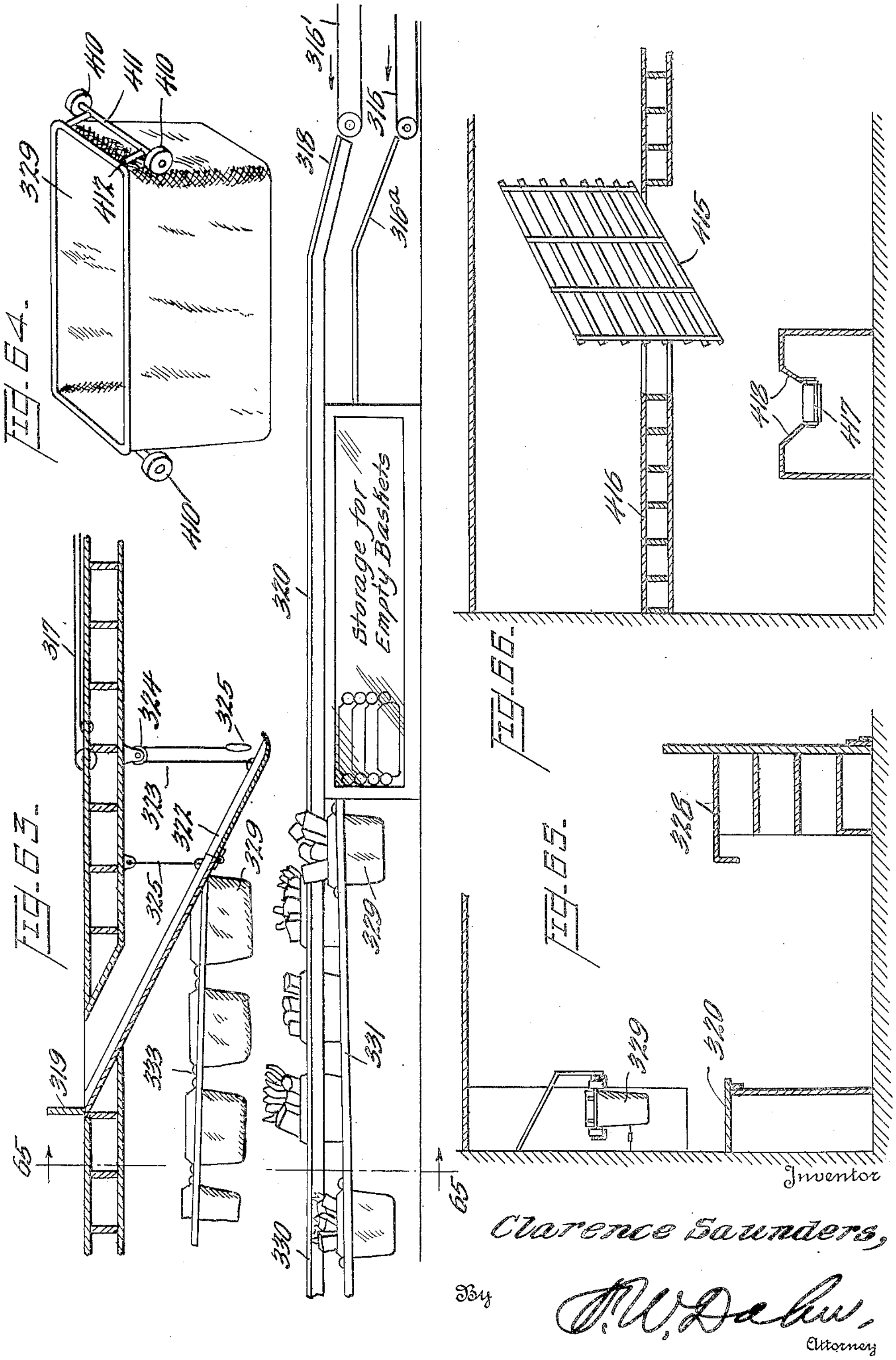
Figure 77:
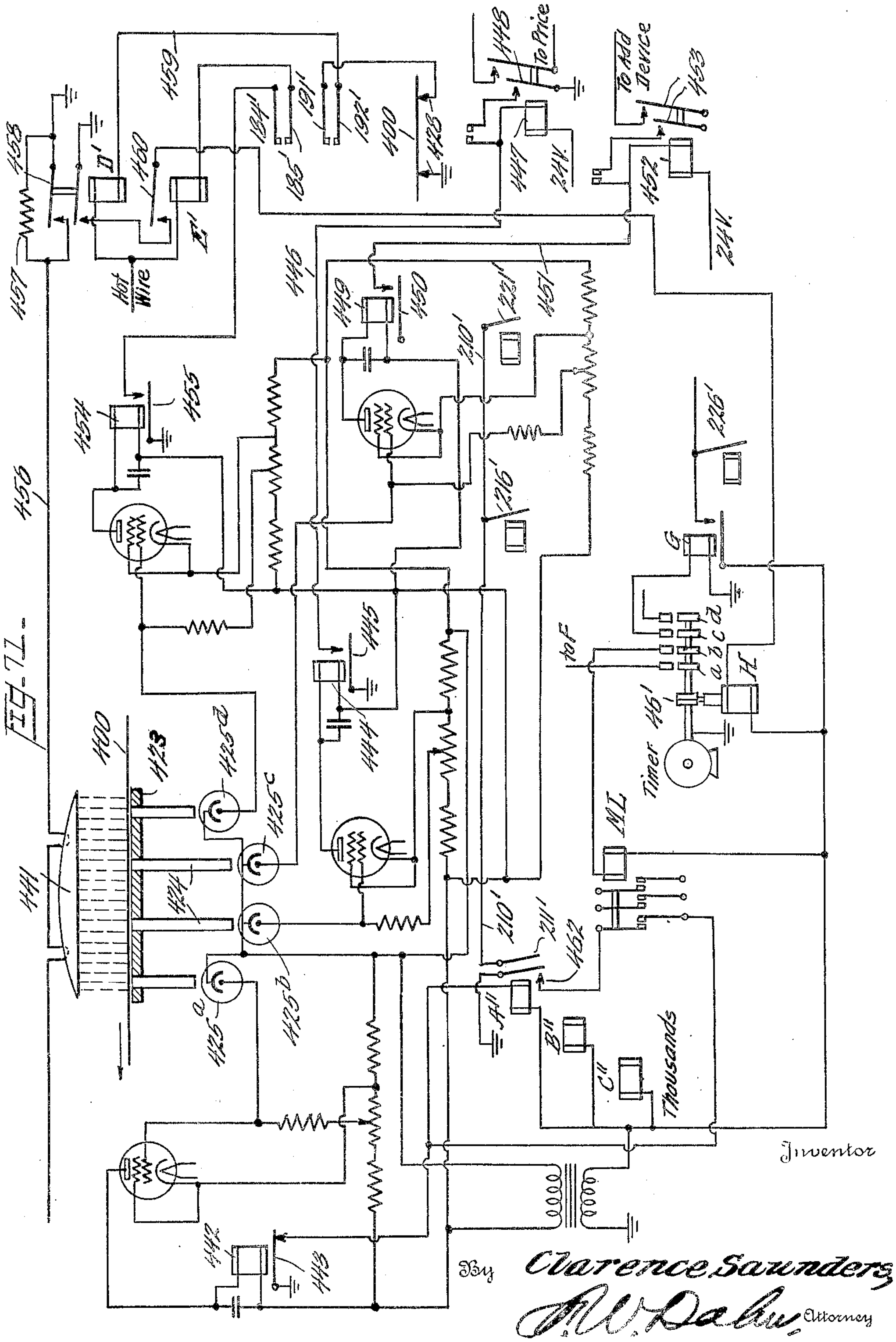

Fig. 47, a ground plan of a preferred form of my invention;

Fig. 48, a perspective of a display cabinet forming a part of the store;

Fig. 49, a top plan of a mechanism case forming part of the display cabinet, with its top plate removed;

Fig. 50, a vertical section on line 50—50 of Fig. 49;

Fig. 51, a vertical section on line 51—51 of Fig. 49;

Fig. 51A, a fragmentary view similar to Fig. 5, but on an enlarged scale;

Fig. 51B, a cross section on line 51B—51B of Fig. 51A;

Fig. 51C, a detail perspective of a key trough;

Fig. 51D, a wiring diagram for the motor shown in Fig. 49;

Fig. 52, an enlarged detail of parts shown in Fig. 51;

Fig. 53, a horizontal section on line 53—53 of Fig. 52;

Fig. 54, a front elevation of a printing unit;

Fig. 55, a perspective of a slug forming part of a printing unit;

Fig. 56, a section of a key used with the preferred form of the invention, taken on line 56—56 of Fig. 59, looking in the opposite direction from Fig. 51, Fig. 57, a rear elevation of said key;

Fig. 58, a section on line 58—58 of Fig. 56;

Fig. 59, a section on line 59—59 of Fig. 58;

Section 60, a detail of latching means for the shaft of a paper roller;

Fig. 61, a section on line 61—61 of Fig. 60;

Fig. 62, a section on line 62—62 of Fig. 59;

Fig. 63, a longitudinal elevation, partly in section, of delivery means forming part of the invention;

Fig. 64, a perspective of a basket forming part of the delivery means;

Fig. 65, a section on line 65—65 of Fig. 63;

Fig. 66, a vertical section of part of the store, illustrating one method of dispensing canned goods and the like from the mezzanine floor to a conveyor on the main floor;

Fig. 67, a top plan of a translation machine, with its lid raised;

Fig. 68, a longitudinal section on line 68—68 of Fig. 67; but with the lid down;

Fig. 69, a cross section on line 69—69 of Fig. 67;

Fig. 70, a fragmentary view of the printed ribbon that controls the dispensing of merchandise and other operations in the store or the like, by means of the translation machine; and Fig. 71, a wiring diagram for the form of the invention shown in Figs. 47 to 71.

In the store as shown in Fig. 1, there is represented one desirable arrangement of store furniture. In this arrangement there is a display room 10 having an entrance at 11 and having about its walls display devices, cases or cabinets 12, which may be of the character hereinafter more fully described. Adjacent the entrance there is a table 13 on which are placed in convenient position for the use of customers a number of shopping or listing keys 14, which may be of a character hereinafter described.

In one corner of the store there is shown a cashier's stand or table 15 provided with a contact machine 16 and back of said table there is a packer's stand 17 to which articles of merchandise are brought by a conveyor belt 18.

The remainder of the store forms a stock room, here shown as being provided in one part with a bank 19 of merchandise chutes which discharge merchandise to a conveyor belt 20. In another part of the stock room there are several series of banks of trip shelves 21, 21, arranged in pairs at opposite sides of conveyor belts 22. It will be seen that the conveyor belts 20 and 22 are arranged so as to discharge onto a common conveyor belt 23, which in turn discharges onto the belt 18 that carries the articles of merchandise dispensed from the various chutes and trip shelves to the packer's stand 17 where they are placed in suitable containers for delivery to the customer. It will be understood that the store arrangement shown in Fig. 1 is merely one of many possible variations, the principal matter of importance being that the display room is so separated from the principal stock distribution room that customers have no access to the latter room.

*The display cases*

Fig. 2 shows a display unit 12 such as has been found suitable for use in a store, one unit being shown in full, with portions of two others at opposite sides thereof. This unit includes a cabinet having shelves 24 for supporting merchandise, these shelves being supported by side members 25 at each end thereof, which side members are here shown as having spaced apertures 26 to receive triangular supporting brackets 27, herein shown as consisting of metal strips bent to form a horizontal portion with a narrowed tongue to enter one of the holes 26 and having an inclined portion with a narrowed tongue to enter the next lower hole. It will be seen that the shelves can be arranged at any suitable distances from one another to vary the space between the shelves according to the nature of the merchandise to be displayed. Thus, there are shown at the top of the cabinet small cans 28, while at the bottom there are shown large cartons 29.

At one or both sides of the cabinet there are key receiving structures which may be entirely independent of the cabinets or integral therewith. A key receiving structure as shown comprises a trough having side bars 30, 31, (Fig. 5) unitary with a back portion 32 and having crossbars 33 separating the key pockets. The side members 30, 31, are provided with slots 34 and at the bottom of each pocket there is secured to the rear portion 32 a bar 35 provided with a holder 36 to receive a slug 37. As shown in Fig. 5 this slug is provided with letters 38 indicating a specific article of merchandise and with numerals at 39 indicating the price of said article. The slug will preferably be made in two parts, so that the price can be changed without changing the name, and obviously it may be made in any suitable number of parts consistant with its purpose. The bar 35 is also provided with guide pins 40 for a key and with a plurality of openings adapted to receive pins 41, which pins may be inserted in suitable number and arrangement for cooperating with the key. These pins fit tight in the holes, but can readily be removed and replaced.

The display spaces between shelves 24 are closed at the back in any suitable way, and are also closed at the front by means of glass 42 (Fig. 3) so that the customers have no access to the articles on display. The price of each article on display is indicated (Fig. 2) by numerals suitably affixed to the face of the sheet of glass 42 with a lead line extending from the price indication to an adjacent key pocket as at 43. In the construction shown in Fig. 2 there are two or more key pockets for each space between a pair of shelves and it will be evident that the price line may extend from one of said pockets to an article positioned near one end of a shelf while another may lead to an article farther from the end, so that there may be a great variety of arrangements. In each case, however, the customer need only select an article and follow the line therefrom to the correlated pocket in which the key is to be inserted. Obviously, a single row of pockets may be arranged between a pair of cabinets, the price lines leading from some pockets to one side of the row and some to the other side.

In the construction shown there is, in connection with each row of pockets, a lever 44 terminating in a handle 45 (Figs. 2 and 4) said lever being pivoted at 46 on a fixed part of the structure and being pivotally and slidably connected to a pair of bars 47 at opposite sides of the pockets (Fig. 7). Each of these bars is normally held in raised position by a spring 48 secured at its upper end to a fixed part of the display means and at its lower end to a bar 47. The bars are provided with oblique slots 49 engaging with fixed pins 50 so that as the bars move downward they are moved backward bodily. The bars also have inclined slots 51 with horizontal lower portions to receive pins 52 projecting from keys 14 (Fig. 4).

*The shopper's key*

The keys 14, which are used by customers in listing the goods selected in their progress about the display room 10, are shown in Figs. 4, 7 and 9 to 14. Each key comprises an outer casing with a downwardly extending handle 54. Inside the key there are a pair of parallel plates 55 having slots 55′ for receiving a roll of paper or the like 56, from which the strip 56′ is unwound. The casing is provided with a rear member comprising an inclined top part 57. A vertical rear portion 57′ and side members 60, the whole being pivoted at 61 at opposite sides of the key, and being normally held in place by pin 58 extending through a perforation in member 57′, the pin being forced outward by a leaf-spring 59. This member 57′ forms a rear closure for the key and the upper face of part 57 serves as a guide for the paper strip passing out of the key.

The parallel plates 55 are connected at the bottom to form a detachable trough or holder for the paper roll, said trough having forwardly extending arms carrying a tension roll 62, here shown as covered at each end with rubber 63. The trough is supported at its rear end by a removable pivot pin 64 and is tilted downward by springs 65 attached at one end to an upper corner of a trough member 55 and at the other end to a pin 65′ on the fixed frame, which forces the tension roller down on a cooperating rotary feed roll 66 having corrugated end enlargements 67. The paper roll is provided with a central journal 68 resting in the slots 55′ and many be removed by merely lifting it out of the said slots after moving the closure out of the way about its pivots 61.

The paper passes from the roll to the front of the key, where it rides over the rear one of a pair of fixed punch plates 69, 69′ between which the paper strip 56′ passes. Springs 70 bear against a fixed frame member 70′ and against shoulders of plungers 71 (Fig. 12). The plungers carry a perforated plate 72, in the holes of which are slidably mounted punches 73 adapted to be moved selectively backward by means of the pins 41 so as to perforate the paper when the key is inserted in a pocket and is properly manipulated. The plate 72 moves backward with the selected punches which pass through holes in the punch plates 69, 69′, to punch holes in the paper, according to the pattern set up by pins 41. A plate 72′ fixed in place in the key bears on the heads 73′ (Fig. 12) of the punches to hold them in place. Holes 75′ (Fig. 13) in the plate 72′ receive the guide pins 40 in the key pockets that assist in pushing back the plate 72 and in keeping it in place straight across the key.

The punch plates and punches are set in a removable frame which also carries inking mechanism comprising a platen 74 in front of which is an inked ribbon 75 carried by a pair of spools 76, 76′, (Fig. 14) provided with winding and unwinding means comprising ratchets 77, 77′, selectively operated by a pawl 78 pivoted on a cross member of a reciprocable actuator hereinafter described and having a coil spring 79 on its pivot to aid in holding the pawl in position. A triangular piece 80 mounted behind and between the ratchets 77, 77', aids in holding the pawl in position to insure its engagement with one ratchet or the other, as the case may be. A control element 81 is pivoted on the frame between the ribbon spools, said element having depending wings 82 bearing against the rolls of ribbon to shift the winding of the ribbon from one spool to the other when a spool becomes empty. At its forward end the controller is provided with upstanding fingers 83 which serve to reverse the position of pawl 78 as dictated by the empty condition of one or the other spool.

It will be seen upon consideration of Fig. 9 that the paper strip passes from the roll 56 between the punch plates 69, 69', then between platen 74 and inked ribbon 75, then over the top of the fixed frame member which carries the pawl 78, thence between rollers 62 and 65 and then over the apron 57. The portion extending outward at the rear of the key may be conveniently torn off by first bending it over the back of the key and then tearing off so much as contains the list which has been printed thereon.

The actuator for the paper feeding means, the printing mechanism and the punching mechanism comprises a pair of side members 84 connected by the bridge 85, said side members having protruding portions 86 at the front of the key and having laterally extending pins 87, acted on by springs 88 anchored to the key body at 88' to hold the parts 84, 85, 86, in their forward position. One or both of the members 84 may carry, close to a side of the key, a pawl 89 held by a spring 90 against the ratchet 65' for rotating the feed roll 65 at each reciprocation of the actuator. A pin 91 limits the movement of the pawl toward its ratchet. The movement of the actuator is a relative one, since it will be seen that when the key is in place in a pocket and the handle 45 is pulled down, the slots 51 will engage with the pins 52 at opposite sides of the key, and will draw the key inward toward the bottom of the pocket while the projections 86 bear against the bottom of the pocket and prevent the parts integral therewith from moving. Hence, the key slides bodily inward due to the combined action of the slots 51 and the action of slots 49 which are moving the bars 47 inwardly with respect to the display cabinet. As the key moves inwardly with respect to the cabinet, the pins 41 are brought to bear against the punches 72, according to the pattern set up by the pins, and therefore holes will be punched in the paper according to the code or pattern for the particular pocket and therefore for the article of merchandise which is correlated to said pocket, either for dispensing the article or for other purposes herein described. At the same time the type strikes against the inked ribbon and registers the selected article and its price on the paper. When the handle 45 is released the remainder of the key is drawn outward with respect to the actuator, and during this movement the pawl 89 engages its ratchet to shift the paper into position for producing an indication when the key is again operated as above described, and at the same time the pawl 78 engages one or the other of the ratchets 77, 77', to feed the inked ribbon. Obviously the handle 45 may be operated repeatedly for selecting a plurality of articles at the same time, without removing the key from the keyhole or pocket.

Fig. 15 illustrates a portion of a customer's list, with the names of articles and their prices printed thereon and with perforations 92 arranged between the printed items. Obviously the strip may be of indefinite length according to the number of selections made by the customer. In Fig. 16 there is shown a similar strip with a punch mark at 93, this punch mark being for the purpose of nullifying the selected items indicated at 94 when the strip is applied to the distributing mechanism.

It will be evident that the strip 56' may be of paper or of any other material suitable for receiving marks indicating the name and/or the price of an article, and preferably also capable of receiving indicia adapted to coact with electrical circuit operating means, as described below. And it need not necessarily be wound in a roll, nor even necessarily be a strip of indefinite length, e. g. in some cases a card or the like may be used.

*Dispensing chutes*

Figs. 17 to 21 illustrate an arrangement of chutes suitable for dispensing various articles of merchandise. In this arrangement posts 95, preferably U-shaped in cross-section, are provided on each leg of the U with a plurality of openings adapted to receive bolts for supporting horizontal members 96 at any desired height or angle and extending either to right or left of the posts. The members 96 carry trough-shaped chutes 97 which may be shaped in cross section as shown in Fig. 19, where two side members 98 are integral with a bottom member 99 (i. e., they are U-shaped in cross-section), and have longitudinal ridges 100 extending along the bottom for supporting articles of merchandise for easy sliding. Usually a row of chutes will be arranged on parallel cross members 96 of the frame and several rows will be arranged one above the other, as indicated in Fig. 17. Near the lower end of each group of chutes a strip of metal 101 extends across all the chutes of a group, said strip being in a plane parallel to the tops of articles in the chute and serving, as in the case of canned goods, to prevent the lowermost ones from accidental tilting. The strip may be attached to posts 95 as by means of bolts 102.

Underneath each individual chute there is provided a dispensing means which is so constructed and arranged that it will permit the discharge of only a single article at each impulse of the electrical mechanism, whereby the discharge of articles is controlled. This mechanism includes a detent having two side members 103 at opposite sides of a support 103' fixed underneath the chute, said side member carrying a front bar 104 connecting said side members and standing in front of the chute. The detent is pivoted at 105 and is provided with a slot at 106 in which is located a pin 107. The pin is carried by a link 108 slidably mounted in a slot in the support 103', the link being drawn forward by a spring 108' and connected to a solenoid 109 by means of a pin 110 extending through an elongated slot 111 in said link to allow the solenoid, which is operated by a coil 112, to acquire momentum before it starts the detent, and permit the use of a relatively small solenoid and coil. The construction and arrangement of parts is such that only a single article can be discharged at a time, the detent returning to position in time to prevent discharge of a second article. Fig. 20, as will be obvious, shows in solid lines a detent in holding position and also shows in dotted lines, the released position of the detent.

Articles discharged by the chutes fall first on a baffle 113, made of some yielding material such as heavy canvas, and slide or roll from this baffle down to a conveyor belt 20 which runs in a trough 114 which is preferably rigid or semi-rigid.

*Trip shelves*

Figs. 22 to 31 illustrate a trip shelf structure which is particularly desirable for use with goods which cannot be conveniently or satisfactorily dispensed from a chute. Examples of such goods are bread, fruits, vegetables, fresh meats, and the like. The trip shelves 115 are arranged in a bank of superposed shelves as indicated in Fig. 23 and consists of shelves so inclined that the articles placed thereon will slide off easily when released by gates or barriers, one form of which is shown at 116. A trough-shaped member 115′ is secured to the lower face of the shelf and extends from end to end thereof. The shelves of a bank discharge onto a buffer such as that shown at 113 in Fig. 17, from which the articles slide to a conveyor which carries them to the packer's stand. In the case of particularly delicate articles, such as peaches, eggs, and the like, the buffer may be arranged immediately below the shelf and at a low angle so that the articles will slide gently to the conveyor without being damaged. The space at the top of the shelf is divided by partitions 117 into article receiving spaces, each of which has a gate 116 at its lower end. The gates are pivoted at 118 and are normally in closed position shown in Figs. 23 to 25; Fig. 25 also showing in dotted lines the open position. It will be noted that the opening movement of a gate is limited by an angle iron 119 against which the extremity 120 of the gate strikes. A pivoted trip 121 (Fig. 26) is drawn by a spring 122 into position to engage the arm 120 which projects from a lower corner of the gate and this trip serves to lock the gate in closed position (Fig. 27).

The mechanism for releasing the detents so as to permit the gates to move to the open position shown in dotted line (Fig. 25) comprises an electromagnet 123 whose armature has an extension 124 connected by a link 125 to a reciprocatory bar 126 having inclined slots 127 in which are engaged fixed guide members 128, so that when the bar is moved endwise it is also moved to the right in Fig. 25, or downward in Fig. 27. The bar 126 is engaged by a spring 129 to move it toward the left into the normal position illustrated in the bottom plan, Fig. 27. A traveller or trip plate is mounted on the bar 126, said traveller comprising a trip 130 loosely mounted underneath a slidable plate 131, the plate having its ends bent upward over the edges of the bar 126, as best shown in Fig. 29. The trip is connected to the plate by means of a pair of headed pins 132 (Figs. 28 and 31) loosely engaged in holes in the trip and by a third headed pin 133, also loosely engaged in a hole in the trip, a spring 134 being located between the trip and its head and tending to press the trip upward into position as in Fig. 29. The trip has a finger 135, best shown in Fig. 28, said finger projecting upward into position to engage any one of the fixed lugs 136 of which there is one for each gate, said lugs being here shown as being bent downward from the bracket 137 on which the gate is pivotally supported. The slidable plate 131 is provided with an arm 138, by which means the traveler may be moved to the left in Fig. 28 against the pull of a spring 139, anchored at one end to the frame of the trip shelf as shown at 140 and attached at the other end to a cord 141 which is trained about a pulley 142 and passes thence to the trip plate 131. The latch 121 engages behind the lower arm 120 of the gate, as above stated, when the gate is in closed position and projects so far to the rear that when the bar 126 is moved backward sufficiently far to permit finger 135 to ride off the lug 136, whereupon the trip plate is drawn to the right in Fig. 28 by the action of spring 139, the finger 135 will then strike the rear portion of latch 121, turning it about its pivot and so releasing the gate 116, which is then opened by the action of gravity. For returning the gates to open position, the bar 119 is provided with inclined slots 143 engaging fixed pin 144 whereby the bar is caused to move toward the gates when it is moved endwise to the left in Fig. 30. In such movement the bar 119 will press against the rounded lower ends of the arms 120 and so will move the gates toward closed position. As each gate arrives at closed position its detent will engage behind its arm 120 due to the action of spring 122.

For moving the bar 119 to the left it is provided with an arm 145 extending over the bar 126 and into the path of finger 138. In the operation of the trip shelf, therefore, when an article on a trip shelf is to be selected, the electromagnet 123 is energized and draws the bar 126 to the right. Assuming that the traveler is at its extreme left position, when the bar 126 is moved to the right, it also moves toward the lower end of the shelf on account of the pin and slot connection at 127, 128, so that the finger 135 rides off the detent 136, whereupon the spring 139 pulls the traveler one step to the right, first causing the lug 135 to strike the end of the latch of the next gate and releasing the gate, after which the bar 126 moves back toward the upper end of the shelf, carrying the traveler with it, after which the traveler is pulled farther to the right until its finger 135 strikes the next lug 136. Such action is repeated for each article selected from that shelf until the traveler reaches its extreme right-hand position and the shelf is empty, all gates being now open. To reset the gates the operator grasps the arm 138 and pulls the trip plate to the left, the finger 135 now riding over the lugs 136 and tilting the trip 130 as it passes each lug 136, as is permitted by spring 134. At the end of this movement the finger 138 strikes arm 145 and moves it toward the front of the trip shelf so as to close all the gates, which are then automatically latched in closed position, after which a new supply of articles may be placed on the shelf.

The means for distributing articles from the various dispensing devices, such as the trip shelves and chutes above described, includes electric circuits for actuating the trips or gates of the several devices selectively and the contact machine including a pattern switch for controlling the operation of said contacts under the direction of the list made by the customer, which list includes the name and price of each article and also includes suitable indicia for controlling the circuits through said pattern switch, to all of which is added mechanical means for feeding the strip over the contacts of the contact machine. While the circuit controlling indicia are here shown as consisting of holes in the strips, it will be understood that other indicia may be employed.

*Contact machine*

The contact machine, Figs. 32 to 41, includes a casing 160 mounted on a suitable base such as the table 15 and provided at one end with guides 161, 162, for receiving the customer's list, i. e., a strip of paper or the like of indefinite length which has been torn from the key after being made up by the customer. It will be noted that the guide 162 extends further to the right in Fig. 34 than does the guide 161, thereby facilitating insertion of the strip. The contact machine also includes a two-part lid pivoted on a removable part of the casing, said lid comprising an outer member 163 having a projection 164 adapted to engage under a latch 165 to hold the lid down, and a spring 166 engaging the lid at one end and having a portion coiled about a pin 167 fixed to an upwardly projecting ear of the casing, said spring normally holding the lid open. Underneath the outer member 163 there is a plate 168 pivoted coaxially with the outer member and movable relative thereto to an extent determined by the length of the exposed portion of a screw 169 provided at its lower end with an insulating sleeve 170 threaded on the screw. This plate has a series of openings 171 arranged in two rows, the openings being in staggered relation, and also has a pair of openings 172 spaced laterally from the ends of said rows.

The removable part of the casing includes an upper plate 173 having perforations into which extend lugs 174 of circuit closers 175 which normally project above the upper plane of plate 173 and into holes 171 on the plate 168 when the lid is down. These circuit closers are pivoted at 176 and are moved upward at their forward ends by means of springs 177 attached to their rear ends. The circuit closers are adapted to force contacts 178 selectively against contacts 179, all of said contacts being mounted on a lower plate 180.

The lid is pivotally connected to the top plate 173 by means of pivots extending through upwardly directed ears on a bar 181 fixed to said top plate. A similar bar 182 at the opposite sides of the casing has upwardly directed ears 183 between which the lid fits to insure correct position thereof. The collar 170 on screw 169 passes down through a hole in the plate 171 when the lid is closed and engages a switch member 184 to force the same into engagement with a coacting switch member 185, these members being mounted on a pivot at 186 together with a circuit closer 187 and all being normally moved clockwise about the pivot by a spring 188 into the position of Fig. 40. In the downward movement of the lid a circuit is first closed at 184, 185, after which the circuit closer 187 moves a spring contact 189 against a coacting contact 190, these members also being mounted on the plate 180 and this contact being a momentary one during the downward movement of the lid. Immediately after the contact at 189, 190, is broken, another circuit is closed due to engagement of a spring contact 191 with another spring contact 192. Fig. 40 shows the parts in the position assumed when the lid is raised and all the circuits are open, whereas Fig. 41 shows the final position, wherein the contacts at the left of the figure are closed and the contact at the right is open. Insulating means 193 is shown as interposed between the left hand group of contacts and the plate 180 and similar means is shown at 194 for the right hand contacts.

The contact machine further includes a lower roller 195 supported by arms 196 pivoted at 197 and normally pulled down by a spring 198 to a low level where the roll 195 will not be in position to coact with upper roll 195' for engaging and feeding a pattern strip 200, this strip consisting of a completed customer's list which has been removed from the key and having a series of items printed thereon, together with coacting apertures located in pattern relation suitable for selecting desired articles of merchandise and causing them to be dispensed from the holders in the stock room. The roller 195 is driven by means of a suitable motor connected by a belt 201 to a pulley 202 fixed to the shaft of the roller 195. For bringing the lower roller into driving engagement with the upper roller an arm 203 is secured to the shaft 197 and this arm is provided with an upwardly extending pin 204 held in raised position by a spring 205 which surrounds the pin and sits in a recess in the arm. As the lid is lowered the projection 164 strikes the pin and forces it downward, thus also forcing the arm downward and moving the roller 195 upward against the tension of its spring 198. At the same time the lug 164 engages under the nose of latch 165 to hold the lid down and also to hold the feed rolls in feeding position and the circuit closing devices in the position of Fig. 41. While the apertures are referred to as being suitably located for selective dispensing of articles or items or lots of merchandise, it will be understood that various other purposes may be served thereby, e. g. count of articles, compilation of selling price or of cost, etc.

The general circuit diagram of the selector system is shown in Figs. 42A and 42B of the drawings. In Fig. 42A there is disclosed at K the keyboard or contact machine through which the pattern strip is passed, a timer mechanism driven by continuously operating motor M, and an assembly of translator relays for selecting gang switches controlling the circuits of the chute relays. Also a dagram in Fig. 42B shows the adding machine operating solenoids, a gang switch and the operating circuits for a single gate chute with connections to certain adding machine solenoids. Due to the large number of circuits and relays necessary to the system, only a partial showing of such circuits is feasible in a diagram of this character and consequently only one complete operating circuit is illustrated. A complete circuit through the system will now be traced.

Starting with the pattern strip to operate a single chute (chute 1111) the pattern strip is placed in the keyboard and the lid closed. Referring now particularly to Fig. 42A, the operation just referred to results in the closing of the contacts 184—185, 191—192, all of the finger control contacts, which in this instance are thirteen in number and are indicated $A_1$, $B_1$, $C_1$; $A_2$, $B_2$, $C_2$; $A_3$, $B_3$, $C_3$; $A_4$, $B_4$, $C_4$, and control contact X, as well as the cancellation contacts $F_1$, $F_2$, to which reference will be made later. As has been previously pointed out contacts 184—185 close prior to the closure of contacts 191—192, and contacts 189—190 are closed and then opened for a reason which will be later explained. Leads run from the finger contacts $A_1$, $B_1$, $C_1$, etc., of corresponding translator relays having the same reference letters $A_1$, $B_1$, $C_1$, etc., as indicated in the drawings. The closing of the finger contacts provides a circuit through each such contact from the ground connection on the keyboard through leads to the windings of all of the twelve translator relays as indicated. These circuits, however, are not complete because they are all shown open at the master lock out relay MLR. During the closing of the gate to the keyboard contacts 189—190 were closed and immediately opened. The closing of these contacts energizes the operating coil of MLR which closes the operating circuits of the twelve translator relays. The coils of these relays, when energized, move their armature contacts toward the left and close holding circuits for each relay. The circuit may be traced from ground on the keyboard through the relay windings and thence to the "hot" side of the transformer $T_1$, supplying current to the relay system.

Each of the sets of relays, for example, $A_1$ $B_1$ $C_1$ moves in addition to its own armature contact, other contacts controlling circuits to gang selector switches. The first relay $A_1$ controls, in addition to its own, two other contacts; $B_1$ controls four others, and $C_1$ controls eight others. The other translator relays control contacts in the same manner and to the same extent.

Each translator relay will now hold in closed position until some finger or fingers register with a punched hole in the pattern strip, thus opening the circuit through that particular relay or relays and allowing the relay or relays corresponding to the punched hole or holes to restore the armatures controlled by the particular relay to the position shown in the drawing.

Assuming all of the translator relays closed as just described and that the paper strip or pattern has not moved to an operating point the following circuits will be considered. The circuit from ground on the keyboard through center finger contact X of the keyboard, switch contacts 184—185, coil of relay E to transformer $T_1$ to ground. This circuit pulls the armature of relay E away from its upper contact. Another circuit may be traced from ground on the keyboard through finger contacts $F_1$, $F_2$, switch contacts 191—192, through the coil of relay D and thence to the transformer as before. The relay D pulls its armature downwardly into contact, but does not close the circuit since it is in series with the armature E which has just been moved to open circuit position. The circuit through the coil of relay D is closed subsequent to that through coil of relay E to prevent operation of the timer clutch at this time, since otherwise a circuit would be established to timer H, causing the delivery of an article before the punched holes in the paper reach the contact fingers. This relay D remains closed until the pattern or strip runs out of the keyboard.

*Operation*

The system is now in condition for operation. All the translator relays are in closed position and the paper strip which must be long enough at its leading end to permit gripping of the strip by the feed rolls before any perforation reaches a contact finger, now begins to move through the keyboard until a punched hole is over the control contact X allowing the finger of that contact to move into the hole, opening the circuit and thereby breaking the circuit to the relay E. The armature of relay E moves upwardly closing the circuit from the transformer through the coil H of the clutch solenoid connecting the timer mechanism to the continuously running motor M of the timer, the circuit continuing through the armature relay D to ground.

This timer comprises a continuously running motor M, a clutch controlled by the coil H and a grounded shaft having four rotary segmental contacts thereon with corresponding brushes controlling relays which will now be described. Rotary segmental contact 1′ engages a brush to close a circuit through the coil of relay F to transformer $T_1$. Contact 2′ engages a brush to close a circuit through the coil of relay G to transformer $T_1$. The third contact 3′ closes a circuit in parallel to the circuit closed by contacts 189—190 to energize the coil of master lock out relay MLR under certain circumstances. The fourth contact 4′ closes the circuit to solenoid MB to operate the motor bar of the adding machine shown schematically in Fig. 42B. When the clutch coil H is energized the timer operates to close the circuits referred to in the order described.

When relay F closes, current flows from transformer $T_1$ through the contacts of relay F to the point N from which the current passes through all of the translator relay controlled switches which are at this time in the left hand closed position, thus closing circuits to the gang switch selector switches.

From the point N current flows through conductor 210, through contactors 211, 212, 213, conductor 214, to the coil 215 of gang selector switch No. 1 (GSS1) to ground. The operation of this relay closes the circuit from the point N through contactors 216, 217, 218; conductor 219 to the coil 220 of the gang switch GS1 to ground. Current also flows from the point N through contactors 221, 222, 223, conductor 224, to coil 225 of selector switch P to ground. The closure of the contacts controlled by selector switch P just referred to, closes the following circuit; from the point N through contactors 226, 227, 228, conductor 229, selector switch P, conductors 230, 231, 232, through the first contact 223 of gang switch GS1, conductor 234, to coil 235 of chute relay 1111 to ground.

The operation of chute relay 1111 just referred to closes the circuit from the transformer $T_2$ to conductor 236, contactor 237 of chute relay 1111 to chute gate solenoid 238, conductor 239, to ground at 240. The energization of the coil 238 operates the gate of the chute 98 corresponding to the item 1111 releasing a single item from the chute.

Upon operation of the chute relay controlled by coil 235, contact 237 is closed as described. This relay also closes three additional contacts which are connected to operating solenoids for the keys of an adding machine as indicated in the lower left hand portion of Fig. 42B. These solenoids are supplied with current from transformer $T_1$; the particular circuits controlled by coil 235 are as follows: From transformer $T_1$ (Fig. 42A) conductors 241, and 242 (Fig. 42B), solenoid 243, conductors 244, 245, 246, 247, contactor 248, to ground 240. Also from conductor 242, solenoid 249, conductors 250, 251, 252, 253, contactor 254, ground to 240. Also a third circuit from conductor 242, conductor 255, solenoid 256, conductors 257, 258, 259, 260, contactor 261, ground at 240. The operation of the three solenoids 243, 249, and 256 sets up the price on the adding machine of the item discharged by the operation of the gate of the chute 98.

As indicated above, when contact 1′ of the timer closes, relay F is energized to supply current from the transformer $T_1$ to the point N and thence to the various circuits described. Subsequently, contact 2′ operates to energize relay G which closes a circuit in parallel to that controlled by relay F and the circuit of relay F is opened at timer contact 1′, relay G maintaining the circuit. The next operation performed by the timer is the closing of the contact 3′ which closes a circuit through conductor 241, coil of master locking relay (MLR), conductor 262, contactor 3′ to ground. The operation of relay MLR operates to reset the translator relays which is, of course, necessary after discharge of each item from its chute. The next operation of the timer is to close the circuit through contact 4′ as follows: From transformer $T_1$ conductors 241, 242, 263, solenoid 264 for operating the motor bar of the adding machine, conductor 265, contact 4′ of the timer to ground. This circuit closes the solenoid 264 to operate the motor bar of the adding machine and make the usual record, of the price of the article discharged, on the tape of the machine.

Meanwhile the pattern passing through the keyboard has caused the center control contact X to close, thereby energizing the coil of relay E and opening the circuit of the clutch coil H to disengage the clutch and stop the timer at the end of one complete revolution of its contacts, i. e., at the end of one complete dispensing operation for one article. As noted, contact 3′ of the timer has operated relay MLR to restore the translator relays to closed position and the machine is in condition for a second operation, brought about by movement of the pattern through the keyboard. It will be noted also that the operation of the master lock out relay MLR is under control of the timer during normal operation of the system, the contact 3′ closing a circuit in parallel to that controlled by the contacts 189—190 on the keyboard which are only operated when the keyboard cover or lid is closed and then only momentarily.

In the event a customer has made out a slip containing several items, one of which he desires to cancel, this can be accomplished in the following manner:

The operator of the keyboard punches a hole in the pattern strip along either side a distance back of the item desired to be cancelled corresponding to the distance between the fingers 172 and 174 on the keyboard so that such hole will come over either one or the other of the fingers 172 when the holes corresponding to the item to be cancelled are moved over fingers 174. It will be apparent that the fingers 172, or one of them, will be permitted to move into the hole punched in margin of the pattern and open the contact or contacts controlled by the fingers 172. The contacts controlled by these fingers are shown in the keyboard diagram (Fig. 42A) at contacts $F_1$ and $F_2$. It will be apparent, therefore, that if either contacts $F_1$ or $F_2$ is opened, the circuit through the coil of relay D will be opened which will prevent the energization of the clutch coil H when or if relay E is released to close its upper contact which would normally energize the clutch coil. The item desired to be cancelled would, therefore, not have any effect upon the selector system and such item would not be selected or discharged. It may be noted that the strip must extend far enough back from the last set of perforations (one or more) so that said last item will be discharged before the end of the strip passes contact finger 172, otherwise said item would not be discharged. The pattern strip would continue through the machine and the next item indicated thereon would be selected in the usual manner, contact $F_1$ or $F_2$ being restored to closed position by movement of the paper strip, thereby again energizing the coil of relay D to reset the circuit for the clutch coil when relay E operates. When the strip runs out the finger contacts open, releasing the relay armature D which renders the circuit to the timer inoperative. This completes the dispensing of articles for one order, and the arrangement is preferably such that all the items of an order are delivered to the packer's table before the items of another order can reach that table, this being controlled by the clerk at the translator.

In Figs. 43 and 44 I have shown details of the cashier's desk and the packer's stand. The cashier's stand carries one or more contact machines 16 and one or more computing machines. In a desirable arrangement there will be an adding machine 270 for computing individual bills for customers, a second computing machine 271 for adding up the cost price of all articles sold during a day or other desired period of time, and a third electric machine 272 for computing the total sales as each item is registered on machine 270.

Desirably, the packer's stand includes a number of folding tables of such character that the legs 273 can fold against the top 274 and the top can then fold down against the fixed part of the stand, so that idle tables will be out of the way. In order that all items on a list may be directed onto any selected one of the tables I provide swingable gates 275, one for each table, these gates being pivoted at 276 to swing vertically into and out of the position shown. There should be a gap between orders, so that the belt may be cleared and the whole of one order delivered before delivery of the next order begins, it being understood that the contact machine is intended to deliver about 200 items per minute, while the belts preferably run about 700 feet per minute. Thus any packer who is not busy will put down his gate 275 so as to receive the next order on his table.

Signaling devices may be provided, both for the chutes and the trip shelves. In each case they are located at the rear of such devices, so as to be visible to the attendants in the stockroom, who, of course, work mainly at the rear of said devices. In the case of the chutes the signal shown (Figs. 17 and 20) comprises an electric lamp 277 connected by conductors 278 to a two-bladed switch 279, the upper blade of which is insulated from the lower blade. A pivoted actuator 280 is normally held in the dotted line position (Fig. 20) by the articles in the chute 90. The actuator is preferably located at about the mid-length of the chute, and when the rearmost article in the chute passes beyond the actuator the weight of the long rear arm causes it to assume the full line position of Fig. 20 (or said arm may be weighted) and so to close the switch and operate the signal, which may be of any suitable visual or audible character.

In the case of the trip shelf a similar two-blade switch 281 is attached to the bar 119 or other suitable fixed part in such position as to be closed by the rear end 120 of the gate 116 when the gate opens and its tail strikes the lower flexible blade. The switch closes a circuit through the conductors 282 to the signal 283, here shown as an electric light bulb.

By the use of the arrangements herein shown and described, I am able to utilize a thin flexible strip of paper or the like as the controlling means for the contact assembly, instead of a stiff card such as used in various tabulating machines, etc., and so can make a list of indefinite length as may suit the desires of a customer. Obviously the term "customer" as used in the description and claims is intended to cover anyone who may make up a list of articles to be assembled, as in automobile repair shops, machine shops or any other place where variable assemblies of articles are made, and this term is used as a matter of convenience but not for limitation, as is also the case with various other terms herein used. The strip will really be made of paper, but any other convenient or desirable material may be substituted, such as cellophane, and I may sometimes use cards for my purposes. Holes punched in the slip constitute the preferred indications for control of the contact assembly, but I do not limit myself to the use of holes for the purpose of actuating circuit closers, nor to the use of pivoted switch members. While electrical operating means of the general type illustrated are preferred for control of dispensing means and/or other mechanisms it is within the scope of my invention to use such means as the photoelectric cell or to use, in connection with a perforated strip, pneumatic means for selective control of dispensing means or other devices by air blown through the properly located perforations, etc.

While I have shown in the display room here depicted shelves each adapted to support a plurality of cans or other containers, it will be preferable in many, if not most, cases to provide display devices having a display space for each individual article on display, the price being shown directly in front of the space on a wafer or label, or being shown in contrasting color on a small area specially painted or otherwise treated to show the numerals clearly. It is not essential that an article itself be on display in the display space, since in some cases I may set a picture of the article in the space, or even a card with the name of the article printed or written thereon.

When an additional computing mechanism, such as are indicated at 271 and 272, is used for the purpose described there will be added to the wiring connections leads such as shown at *a, b, c*, in Fig. 42B, these leads going to another computing machine as in the wiring diagram, and being duplicated if two such machines are used.

Fig. 45 is a geographic layout showing one method of use of my invention. In this method it is contemplated that display rooms 290, 291, 292, 293, etc., of the general character of those herein described, or of any other suitable character adapted for use by customers in making up lists of desired articles, shall be distributed at suitable points, as at convenient points about a city or in villages and at other places convenient for access by customers, while at a convenient central location there will be a distribution store 294, which may be either a complete store with both display and distribution features or may be intended only for distribution purposes in the filling of orders taken elsewhere. Customers can make up their lists of desired articles conveniently and expeditiously, and these lists can be picked up at stated times, or even mailed to the central location, and can there be filled quickly and accurately. The assembled goods for each order can then be delivered to the respective points of origin or to the homes of the customers in any convenient or desirable manner.

In Fig. 27 there is shown a device such as may be used to count the dispensing operations at an individual tripshelf or chute or other dispensing device such as may be used in the store, so as to keep account of the number of items sold of the article dispensed at that point, and such devices may be positioned at any desired chutes or tripshelves. The counting device as here illustrated comprises counting means 124*c* operated by an oscillatory arm 124*b* which is actuated at each reciprocation of the armature 124, or other reciprocatory or oscillatory part, by means of a lug 124*a* on such part.

In Fig. 46 I have shown a modified form of strip such as may be in a store where there is no automatic delivery. In such a store there may be a display section or room, and by the use of a listing key or other like device each customer can quickly scan sample items of all goods carried by the store and make a selection just as in the case of a store provided with automatic delivery. In this case it is contemplated that the strip or striplike device shall show the aisle number and selection number where the article in question can be found, together with the name and price. Thus in Fig. 46, the first item is found in aisle 3, section 7, the next item in aisle 3 section or cabinet 9, etc. Even the punched holes or other like indicia might be omitted in a store not supplied with automatic adding means.

The counters (Fig. 27) might be grouped with a solenoid individual to each counter instead of being operated by the solenoids of the merchandise holders. Counters may be used only for certain articles, they may be variously located and arranged in groups, etc. From the closed circuit translator relays we may have a double lead, one going through the gang switch system to a relay with a lead only for dispensing an article of merchandise and the other going through a duplicate gang switch selection to a relay with leads to perform any and all of the functions of (*a*) selling price additions, (*b*) cost additions, and (*c*) count of number of sales of an article or item (which item may be plural, e. g. three cakes of soap for ten cents).

Again, instead of operating the key by a hand lever it may be foot-operated, or the rack may be operated by a solenoid energized by means of a circuit operated by an electric button or other switch. The contact machine for the punched hole method may be operated by pneumatic means, instead of the relays, by causing air under pressure to be forced through the holes in the strip. The key may be carved in many ways, or may even be dispensed with, the listing being done in some other way.

*Photoelectric cell control method*

In the preferred form of the invention shown in Figs. 47 et al. Fig. 47 represents a general layout such as may be utilized for the customers' shopping space, additional storage and dispensing spaces and the like being provided at the rear of the store or in an upper story, according to availability or preference. With such an arrangement as shown in Fig. 47 display cabinets or equivalent devices may be arranged in rows along the sides of the lobby and along the end walls, etc., a display cabinet for fruits and vegetables may face the entrance at 303, and a meat display cabinet or large inclined shelf may be located close to the cabinet 302, as for instance at 304.

The store in general may be provided with air conditioning means though usually that will not be the case and is not necessary. It is however highly desirable to have refrigerating means for the meat display cabinet and for the meat dispensing section of the store, in fact essential in summer and in the warmer parts of the world, and such means will be provided and suitable sprinkling means will be provided for the vegetable displays, etc.

A key table for the customers' keys is located at 305 so as to be convenient for customers going either to the fresh commodity side or to the side for packaged and canned goods and the like. Back of the displays 302 and 304 there is an aisle for use of clerks in supplying the said displays, and behind the aisle there is a refrigerated room containing storage shelves 306 for meat, and tripshelves 307, 307 for automatically dispensing the same, which shelves may be of the type disclosed in Figs. 22 et al., or of other character suited for the purpose. The tripshelves discharge their contents onto belts 308, 308, and these belts carry the selected meat portions to a discharge point comprising a boxlike container with a lid that may be raised by the attendant for removal of packages but which normally remains closed to conserve the cold air in the room.

Back of the meat room there are provided such spaces as a meat storage room 310, a storage room 311 for fruits and vegetables and a relay room 312. Work tables 313, 314 may also be located here for convenience, and tripshelves 315, 315' for fruits and vegetables may be located in this room, as well as at other convenient places, preferably at points readily accessible to the clerks who must keep them supplied. Merchandise from shelf 315 passes to a belt 316, then to an incline 316a, which checks its velocity, and so onto the table 320, while articles from shelf 315' pass to a belt 321, then to another belt 316' (Fig. 63), then up an incline 318, and so to the table 320. A belt 317 on the mezzanine floor carries canned and bottled goods and the like, such goods being thrown across a space above a chute 322 that guides the goods downward to an order assembly table 320. If an article has sufficient momentum to pass beyond the chute, it will strike an abutment 319 and will fall into the chute.

The trough 322 (Fig. 63) is pivoted at its left-hand end and is shown as provided with a rope 323 threaded over a pulley 324, the rope being provided at its free end with a weighted handle portion 325 whereby the trough may be raised when desired, so as to be out of the way, while the assembly clerk is working on the previous order or on merchandise coming from conveyors on the lower floor, the merchandise from belt 317 simply accumulating on the trough-like chute at this time and being dumped when the clerk is ready for it. An intermediate support in the form of a cord connecting an intermediate part of the trough to a fixed upper member is shown at 325. Articles may be fed to the trough by a conveyor of any desired type or by chutes such as elsewhere herein shown or in other ways.

A cashier's desk is indicated at 326, where the customer's keys are handed to the cashier, who detaches the list made by the customer, gives him a numbered check, places the number of the check on the list, and then places the list on a narrow belt 326' (Fig. 47) which carries it to a clerk at the far end of wrapping counter 328 where there is a translating matchine 327 and an adding machine 327'. The number on the check identifies the customer, as No. 1, No. 2, etc. The clerk at the far end of counter 328 passes the list through the translation machine, whereby the machine causes selection and dispensing of goods to take place, while also adding the prices on machine 327', and counting such items as are to be counted, etc. The clerk then attaches the list to the adding machine total slip. All articles are either discharged onto the assembly table, or delivered at a point close to it. From the assembly table the goods are pushed into a basket such as shown at 329 in Fig. 64, the basket being on an order track 330, the slips are placed in the same basket with the goods of an order and these baskets pass along the delivery track 330 by gravity (the far end of the track being slightly lower than the near end). The baskets are lifted from track 330 by clerks at the wrapping counter, the goods are placed in bags or other suitable containers or wrapped in paper, as the case may be, and are then placed in similar baskets to which baskets the customer's list and the total slip are attached by clothespins or other attaching means. The order baskets are placed on an inclined delivery track 331 that carries them around the back of the cashier's desk to the front of the store where the goods and the customer's list may be delivered directly to a customer over the counter at 332, after he has shown his check and paid for his purchases. The emptied baskets are returned to the assembly table by placing them on another oppositely inclined runway 333 which returns them to the assembly counter to be refilled. The space under the wrapping counter 328 furnishes convenient storage for empty baskets, which are collapsible, as hereinafter explained.

The display cabinets 301 are generally L-shaped in section, and are preferably duplicates in all respects, each having an upright part with a plurality of shelves 334 for display of goods or devices that are indicative or descriptive of the same. As shown at the left of Fig. 48, the shelves have spaced-apart numbers thereon, the numbers being spaced sufficiently far apart so that customers can see unmistakably which number relates to any desired article. The price of the article is shown on the glass in front of the article, and evidently may be placed only for the one article for display in the display case, thus obviating the need to mark the price on each article in the store and saving much time in remarking when prices change. As shown, a convenient arrangement for articles such as canned and bottled goods consists in six shelves in a bank, with space for six articles on each shelf, but of course, the arrangement will vary with the goods, etc.

Below and in front of the display shelves there is a ledge 335, also referred to as the key panel top, provided with a set of holes 336 for receiving the key hereinafter described, these holes being preferably arranged to correspond in number and location to the article positions indicated by the numerals on the display shelves, and each having a number corresponding to one of the article positions and to the number thereat. A pushbutton 337 is provided for each display unit for starting the operation of mechanism described below, and a signal light 338 is located on the unit above the ledge 335 so as to indicate to the customer that the device is being operated.

The holes 336 are shaped to receive the reduced end of a key 339 (Figs. 56 to 62) which carries a roll 340 of paper or other strip or ribbon material adapted to be printed on, with means cooperating with devices underneath ledge 335 for feeding the paper so that spaced lines of printing are produced thereon. The mechanism located underneath the ledge 335 (Figs. 49 to 55) includes a motor 341 connected by worm gearing 342 to a shaft 343 that has cams 344 located thereon at spaced intervals along the shaft. Each cam is located between two upstanding lugs 345 on a type carrier operating rack 346. There are four rack bars 346. These bars support angle irons 347, each provided at intervals with a pair of arms 348 terminating in opposed fingers 349 for holding a set of slugs 352 which are notched to engage the fingers and are held in place by a removable top member 351.

The type carriers are shown as holding five slugs each, one of said slugs being shown in Fig. 55, the body being indicated at 352; the side slots that slide down the fingers 349, at 353; and the printing means, at 354. It will be understood from Fig. 54 that all five slugs may bear circular projections for imprinting dots on the paper strip, while at least one slug may bear projections for printing the name of the article of merchandise to be dispensed, with the price and the quantity, if desired or necessary.

The type carriers are supported by a framework including flat-topped trough-like sheet metal members each comprising upper flat portions 355, 355 forming parts of the support for a horizontal ledge 335, sides 356, a bottom 357, and laterally extending wings 358 and 359, with a downward extension 359' between parts 358 and 359, all providing guides for the listing key.

I have shown four of the bars 346, each of said bars being carried by brackets 360 to which they are secured by pin-and-slot connections (Fig. 51), and it will be evident that when the motor of a section is started by pressing button 337 the shaft 343 will be rotated to reciprocate the bars 346 and with them the type slugs on the type carriers whereby the slugs are made to print on the paper carried by any key that is in position to expose its paper strip to the type at any one of the various positions corresponding to the holes 336

Below the bars 346 there are paper feeding rack bars 365 (Fig. 51) each having upstanding pairs of teeth 366 positioned for engagement with a pin 367 on the lower end of a lever 368 on the key (Figs. 56, 59) when the key is inserted into one of the holes 336. There are six rack bars 365, one for each row of holes, and they are guided on the side members 356 by means of slots at 369 (Fig. 56) engaging pins on the side members, or in any other suitable manner, the rack bars being reciprocated from the type carrier bars 346 by means of levers 371 pivoted at 372 on brackets 371' and connected at top and bottom to the respective bars 346 and 365. Preferably the motor is so constructed as to make but one rotation and then stop, whereby each set of bars 346 and 365 will make one full stroke and return, the bars 365 of course moving in the opposite direction to bars 346.

The means for arresting the motor after one revolution may be of any conventional or desirable character, but a preferred arrangement is that shown in Fig. 51D wherein the pushbutton moves a pivoted pawl 372 to close the motor circuit at 372$a$, the pawl being normally held in position on its axis by a spring 372$b$ coiled about its axis and the button 337 being normally held up by a spring 372$c$. The pawl can move down to a position such as that shown in dotted lines, and it will be seen that the resilient contacts at 372$a$ will separate immediately after a momentary engagement and that they cannot be made to remain in engagement, as by the customer holding his finger on the button. Upon its return movement the pawl swings on its axis so as to pass the upper contact without danger of damaging it. The motor carries on its shaft a cam 373 which acts on a spring contact 373$a$ immediately after the shaft starts to engage it with another contact 373$b$.

It will be seen that upon depressing the button 337 a circuit will be closed through the contacts 372$a$, the conductor 372$d$, the windings of motor 341, conductor 372$e$ and the secondary coil of transformer 374, which circuit will at once be broken at contacts 372$a$. But the motor having started, the cam 373 will have engaged contacts 373$a$ and 373$b$ to close a circuit through conductors 373$c$, 372$d$, the motor windings, conductor 372$e$, the secondary of transformer 374 and the conductor 373$d$, which circuit will remain operative until the completion of one revolution of the motor, whereupon the low point of the cam 73 will have passed under the bent end of contact 373$a$ to permit the same to spring away from contact 373$b$, whereupon the circuit will remain broken until the button 337 is again operated.

A typewriter ribbon 375 is threaded about upright guide rollers 376, 377, at opposite sides of the display unit, the ends of the ribbon being attached to spools 378, 379, and any conventional or desirable ribbon driving and reversing means being provided.

The customers' key, above referred to, comprises a casing 380 having a handle 381 and a lid 382 closing an opening through which a roll of paper may be introduced into the casing. The roll is journaled on a shaft 383 that is held in place by means of a circumferential notch in the shaft, which notch is engageable by a spring-pressed retainer 384. A holding pawl 386, pivoted coaxially with a lever 385, serves to hold a pull-off roller 387 against reverse rotation by its engagement with the teeth of a ratchet 391 on said roller, and said roller 387 is rotated by the oscillation of lever 368 on its pivot 394 which is mounted in a side wall 393 of the reduced lower end of the key. A pawl 395 is mounted on lever 368 by means of pins 396, 396, fixed to the side wall 393, the pawl being slidable up and down by reason of slots in the same in which the pins 396 engage. A spring 397 normally holds the pawl at the upper limit of its movement so that it engages the ratchet 391 to rotate its roller 387 on a counterclockwise stroke (Figs. 56 and 59) but slips past the teeth of the ratchet on the return stroke, i. e., a movement of bar 365 to the right in Fig. 51, due to the yielding of the spring 397. Another roller 398 is journaled in the lower end of the key, on pivots shown at 399.

The paper strip 400 drawn off from the roll 340 by pull-off roll 387 passes first over a guide roll 401, then down about drum 398, thence upward between the periphery of roller 387 and a spring pressed roller 404 that clamps the strip against roller 387, and then out through a slot in the casing of the key, as shown in Fig. 56.

The basket 329 of Fig. 64 is a preferred form for the use indicated, and it has rollers at its four corners, the rollers being mounted in pairs on shafts 411 which are mounted in arms 412 fixed to the rigid top frame of the basket. Preferably the frame is a rigid rectangular one, and the rollers are loose on the shafts 411, while the lower part of the basket may be of canvas or other collapsible material so that the entire basket can be collapsed into small compass, as when it is to be piled up under the counter 320.

Fig. 66 shows a preferred way in which the chutes on the mezzanine floor are arranged for feeding articles dispensed therefrom down to the lower floor, the chutes being otherwise like those of Fig. 17. According to this arrangement a set of chutes 415 is so located with respect to an aperture in the upper floor 416 as to discharge through said aperture onto a conveyor 417 that may be of the continuous belt type and which may have baffles 418 at one or both sides of the conveyor, so positioned as to cushion the fall of the dispensed articles, the conveyor feeding articles either directly to the assembly counter onto another conveyor leading to said table.

The translation machine may be generally similar to that shown in Figs. 32 et al., but is constructed to make use of photoelectric cells for the operations of dispensing and for operations incidental or related thereto. As shown in Figs. 67 to 69, the machine includes a base 420, a lid 421, a circuit closer 175′, and a paper drive roller 422. The top plate 423 is perforated and has set into its perforations thirty-eight rods 424 of Lucite, some of which are bent so as to bring their free ends into proper relation to photoelectric cells 425 below them. In the form of the invention here shown there are four rows of said rods plus two other rods at 426 and 427, all mounted in the said top plate, which also has two holes 428, 428 for exposure of the free ends of circuit closers 429 which are utilized as in Fig. 32, for nullifying any parts of an order to prevent the filling of the order as to the items corresponding in position to the adjacent group of dots on an order list, by depressing a contact member 178′ into engagement with another contact 179′. (Fig. 69.)

Fig. 70 shows a torn-off fragment of the paper strip, such as might constitute a customer's entire order slip for a small order. It will be recalled that the printing means for each position on the strip, or for each article ordered, includes five slugs (Fig. 54) each of which may print dots at a different zone crosswise of the strip. Thus, for an article costing $0.47 a dot may be printed at 432 at the sixth place in the upper line of the upper set of dots in Fig. 70, indicating a price from $0.01 to $0.09, the dot in said figure at that line indicating a price of seven cents. It will be seen that this dot can cut off the light from a correspondingly placed Lucite rod or tubes, in the first row, i. e., the row at the left of Fig. 68. The slug in the second or next highest line in Fig. 54 prints dots for the tens column, i. e. the dots made thereby indicate prices from $0.10 to $0.90. The article chosen for purposes of illustration being one costing forty-seven cents, there is a dot at the third place in second row in the first set of Fig. 70 at 433. The dots printed by the third slug include three positions at the left of the row indicating fractional prices such as ½ cent, ¼ cent and ¾ cent and for $1.00, $2.00 and $3.00. In the fourth row, the first three positions indicate units article selection, the next three indicate tens article selection, and the three positions at the right of the row representing hundreds article selection, while the three positions at the right end of the third row represent thousands article selection. In accordance with the code used for the purposes of this illustration, article No. 3300 in a store is indicated by a dot 434 in second place in the third row, and three dots in the second, fifth and eighth places in the fourth row at 435, 436. The provision of means for indicating fractional prices such as ½ cent, ¼ cent and ¾ cent, is a very useful feature since it is often feasible to give the customer an advantage of such a fraction of a cent on articles where it would not be possible to cut the price by a whole cent.

A dot at 437 on the fifth slug is intended to actuate an item counter for dry groceries, and another dot at 438 is a control dot for the devices controlled through the translating machine, none of which is permitted to operate until this dot arrives in position to cut off the light from its rod, at which time all other dots must be positioned correctly in registry with their light-transmitting devices. The name and price of the article are also printed by the fifth slug. The ribbon also may have holes either at 439 or 440 or at both places, these being made by a clerk with a hand punch at the asking of a customer who has decided not to take an article that has been placed on the order list. A hole at either side will serve to cancel the corresponding item from the list.

The positions of the dots printed on the paper in ordering different articles will of course vary for price and for the code number controlling the dispensing, addition of items of cost, etc., the printed arrangement of dots for any article corresponding exactly to the positions of the Lucite rods on the translator. Lucite is the preferred material since it is necessary to bend some of the thirty-eight rods in order to bring their free ends into operative relation to their coacting photoelectric cells, which can be done with Lucite rods or tubes for the reason that Lucite has the property of transmitting light with undiminished effect whether the rod or tube is straight or curved or crooked. No action can take place until all dots involved in a transaction are exactly over their rods, including the control dot for the article in question.

*Second wiring diagram*

In the case of the photoelectric cell control means for any kind of store the translation machine operates in generally similar manner to the punched hole method first described, and the wiring diagram is generally similar, but certain specific differences are required, as hereinafter described. In the punched hole method of operation, for instance, all circuits are normally closed when the gate of the translator machine has been fully closed, whereas with the printed dot method all circuits are normally open when the said gate is fully closed, and various other differences will appear in the following description.

In the wiring diagram of Fig. 71 a source of illumination is shown at 441 above the translator table 420 from which the Lucite rods 424 depend and over which the paper strip 400, passes from right to left. Four of the photoelectric cells indicated generally at 425 in Fig. 69, are here indicated at 425*a*, 425*b*, 425*c* and 425*d*, with their wiring connections, much of the details of the arrangement being omitted for clarity and as unnecessary to a full understanding of the invention. It will be evident that if the strip passing over the table 420 has dots of relatively light-impervious character thereon the light going to the rods will be interrupted by appropriately positioned dots or sets of dots, thereby energizing the relays corresponding to the rods at which the light is cut off.

The cell 425a may correspond to contact A1 (Fig. 38) for the punched out strip method, and it controls relay 442 and circuit closer 443 to cause operation of the relay A'' of the selection group associated with circuit closer 211' and lead 210'. Relay 442 is one of the twelve required for article selection, as in the modification first described.

Cell 425b, its relay 444, its circuit closer 445, lead 446 and solenoid 447 with the circuit closers 448 operated by said solenoid, constitute means one of twenty-four sets of devices for operating an adding machine, after the manner explained in connection with the description of Fig. 42b when light is cut off from the cell 425b or its related cells; and cell 425c with its relay 449, its circuit closer 450, lead 451, and solenoid 452 with the circuit closers 453 actuated by said solenoid, constitute means for operating an article counter for dry packaged groceries, canned groceries, etc. It will be obvious that a plurality of counters might be desirable, as well as another adding machine for adding up cost prices to the store of articles sold, and other changes may be made in the set-up at pleasure.

The circuit closer 455 (herein usually referred to as the X contact) is controlled through the cell 425d and its relay 454, this arrangement serving through appropriate means to set up the final cycle for completion of the delivery of merchandise, the summing up of the customer's bill, the counting of articles dispensed, and any other functions that may be associated with the final dispensing operation.

For operation of the translation machine the paper strip is inserted and the gate is lowered, whereby the top plate 423 is positioned to admit light from the source at 441 to the Lucite rods 424, it being understood that the member 441 may be a reflector over a light bulb or the like and that the gate may be non-transparent, with a transparent window over the rod ends, if preferred. The gate, in its closing movement, closes the contacts 184', 185', 191', and 192' and the cancellation contacts 428, 429, all as in the form of invention first described. Completion of the circuit through contacts 191', 192', 428, 428 causes relay D' to be energized and to close its two contacts, grounding the end of the 110 volt A. C. wire 456 to make the lights over the photoelectric cells to come on instantly with full brilliance, since the resistor 457 is arranged across the contact 458 and thus permits sufficient current to flow through the filament or filaments or to keep the same heated even though said contacts are open, but not hot enough to give enough illumination to affect the photoelectric cells.

The paper now moving to the left and the dots passing over the exposed ends of rods 424 in the table 420, corresponding relays will be operated, but no complete operation of dispensing, counting or the like can take place because the relay ML is still open. When now the control dot, which is at the extreme right of the paper strip, reaches the point where it energizes the control relay 448 and causes it thus to close the X contact 450 the parts are set for completion of all operations forming parts of a complete dispensing operation and related operations.

When the circuit is closed at 450 a circuit is closed through contacts 184', 185', relay E and lead 459 to a source of current. Thereupon the circuit closer 460 is moved by relay E', permitting current to flow through the winding of solenoid H, which actuates a clutch 461 by means of which rotation of the commutator segments a—b—c—d is initiated. The segment b is connected to the winding of the ML relay and therefore at the instant that rotation of the segment b starts a connection is made through the segment to ground, whereby the ML relay remains energized as long as such connection persists and the ground is held.

Completion of an operation takes place upon energization of the ML relay. At this time the dots of a set relating to an article to be dispensed, including dots for the counting means, adding means, etc., are all in position over their appropriate rods to cut off light therefrom, and the control dot has also reached operative position, breaking the beam of light to its rod and causing operation of cell 425d. When the contacts 462 of the A1' relay close a circuit is closed through them to ground, thereby holding this relay electrically locked, and the same is true of all relays actuated by dots in any set-up for an article dispensing operation. At the instant when the segment a engages its contact a relay (not shown but similar in construction and function to relay F of Fig. 42A) is closed and current passes to the line 210' and to the selection switches that are operated by the closed relays. Relay FX is energized when the segment c has engaged its contact, thus establishing a circuit from the source of current to the circuit closer of the units relay as in Fig. 42A and so to the circuit closers of the merchandise dispenser relay. When the dispenser relay closes the circuit is established through its contacts from the main supply bus bar to the dispenser solenoid.

The adding and counting means also cannot operate until the ML relay closes, as indicated by the open leads in Fig. 71.

It will be obvious to those skilled in the art that many changes may be made in the devices of my invention in addition to those herein suggested, and that various of the parts described and shown are susceptible of use in other relations, either with or without alteration, all without departing from the spirit of the invention, and therefore I do not limit myself to what is shown in the drawings and described in the specification but only as set forth in the appended claims.

In a mail order house, orders might be received in normal manner, each item including a stock number which is also the number to be indicated by punched holes or printed dots or otherwise on the strip to operate the contact machine. Now an operator may read these stock numbers and punch appropriate keys of a keyboard-controlled tape punching machine of known type, thus punching one or more holes as a set for each item, or he may print sets of dots, etc., according to the photoelectric cell method by the use of suitable printing means, after which the strip can be transferred to a contact machine. Since a punch machine operator or a printer necessarily operates more slowly than the contact machine a single contact machine can take care of the strips made by half a dozen or more of the punch machine operators. When such a machine is used the name of the article need not appear on the strip, but only its stock number, as the name is not needed in many situations. The holes or dots or other means or indicia for coacting with circuit closers or other selective means may also obviously be provided in other ways than those herein related.

As shown in Fig. 54, the lowermost one of the slugs is divided into two parts, one of which carries only means for printing numerals relating to prices, this being a matter of convenience in changing prices. In this device a change of price involves only a change in one or more of the dot-type slugs, i. e., the part 476 of the lowermost slug, and a change in one or more of the upper slugs that indicate the price by dots for actuating the adding machine. The highest price that can be indicated by the dot-type strip with the present set-up is $3.99¾, as will be obvious, but obviously the price range can be varied by changing the number of slugs, by changing the arrangement of dots, and in other ways, as the price range to be indicated in the punched-hole method may be increased by increasing the number of holes, for example.

The punched hole method relates entirely to code numbers for articles and prices, as herein disclosed, and the dot-type method is interchangeable therewith and vice versa though one method or the other may be deemed preferable for reasons of convenience or for other reasons. There is no limit as to prices or number of items carried if the number of dots or holes is increased sufficiently, and there is no limit to the number of slugs employed, for example, except as a matter of convenience. It is to be noted that though the punched hole method as described relates to code numbers for both article and price, whereas the dot method relates to dispensing means that clear through a gang switch selection system and other dots that go direct to an identical numbered relay for prices, the reverse of these systems can be employed in the respective methods.

It will be obvious to those skilled in the art that many changes may be made in the devices herein disclosed, all without department from the spirit of the invention; and therefore I do not limit myself to what is shown in the drawings and described in the specification, but only as indicated in the appended claims. It will also be understood that certain specific terms are used for description and not for limitation. Thus the term "paper strip" is used to indicate broadly any strip of material of indefinite length and of printable nature but weak enough to permit the punching of holes through it in the manner described, there being, however, a clear distinction between cards and such a strip of material.

Having thus fully described my invention, what I claim is:

1. A sales room having therein display cabinets, listing keys carrying a strip of paper or the like, punches on said keys, mechanism cooperating with said display cabinets and including openings for key insertion, slugs of type in said openings, means on said mechanism to force the strip against the type for producing an impression corresponding to the slug in the opening, and means for causing the punches to act on the strip.

2. A merchandising apparatus comprising display means for a variety of articles of merchandise, an instrument for recording the name and/or price of the merchandise selected, there being adjacent each article a hole to receive a portion of said instrument means to guide a strip of paper across said portion, a slug of type in said hole, said slug denoting the name and/or price of said article, means on said instrument adapted to carry material to be printed on, punches on said instrument, settable means in said holes for actuating said punches selectively to cause them to punch sets of one or more holes in the material carried by said instrument, and means coacting with said slug to print the name and price of an article of merchandise on said material concurrently with the punching operation.

3. In an automatic store, the combination of a structure providing a plurality of individual display spaces, means adjacent each space for supporting a variable set of punch actuators, a key provided with a plurality of punches movable relatively to the key, means for locating the key adjacent a selected space with its punches in line with individual actuators of said set, and means for moving a part of the key to cause the punches corresponding to the actuators of the set to punch a code arrangement of holes through the paper.

4. A device as in claim 3, including a manually operable lever mounted on said structure, and connections from said lever to said movable part of the key.

5. A device as in claim 4, wherein the positioning means for the key includes a vertical row of pockets located individually adjacent the display spaces to receive a part of the key, and the lever is connected to operate a key in any pocket of said row.

6. In an automatic store, the combination of a structure providing a plurality of display spaces, a pocket adjacent each display space, a slug of type in said pocket, a key adapted to enter any of said pockets, a platen mounted in the key, means for guiding a strip of paper and an inked ribbon across the platen, means on said structure for forcing the platen against the type with the paper and ribbon interposed between the platen and the type, a manually operative member on said structure, and connections from said member to the key for moving a part thereof toward the bottom of the pocket to cause the printing operation to take place.

7. A device as in claim 6, including means for feeding the paper and the ribbon across the platen at each printing operation.

8. A merchandising apparatus comprising a display structure having display spaces for articles of merchandise, a listing key having means for holding a strip of paper or the like, feeding means on the key for said strip, selectively operable punches on said key for providing a pattern of perforations in the strip, means on the display structure adjacent each space for operating selected punches, and means for locating the key adjacent a display space in position to be actuated by said operating means.

9. A device as in claim 8, including a pocket adjacent each display space, said pocket being shaped to receive an end of the key, and variable punch actuating means on the display structure adjacent each pocket.

10. A device as in claim 9, wherein the selected punches slide lengthwise of the key to perforate the strip as the key is moved into a pocket.

11. A device as in claim 10, including a printing slug on the display structure for printing on the strip as the key moves into a pocket.

12. In combination, a display structure having separate display spaces for individual sample articles of a variety of merchandise, a listing key having means to support a strip of paper of indefinite length, selectively operable punches carried by the key, punch actuators variably arranged adjacent the individual spaces, means in connection with the individual spaces for guiding the key into position such that the selected actuators act as the key approaches the display structure to form a pattern of perforations in the strip, and means to feed the strip forward between punching operations.

13. A device as in claim 12, including strip feeding means and means for operating said strip feeding means as the key approaches said structure.

14. A device as in claim 13, including cooperating printing means on the key and the display structure to print on the strip adjacent each pattern of perforations a legend descriptive of the article in the adjacent display space.

CLARENCE SAUNDERS.

References Cited in the file of this patent

UNITED STATES PATENTS

| Number | Name | Date |
|---|---|---|
| 440,839 | Coffin | Nov. 18, 1890 |
| 633,024 | Miller | Sept. 12, 1899 |
| 1,041,802 | Kettering | Oct. 22, 1912 |
| 1,404,280 | Dixon et al. | Jan. 24, 1922 |
| 1,458,510 | Ashton | June 12, 1923 |
| 1,506,382 | Pierce | Aug. 26, 1924 |
| 1,508,095 | Fuller | Sept. 9, 1924 |
| 1,521,521 | Flagg | Dec. 30, 1924 |
| 1,625,490 | Morris | Apr. 19, 1927 |
| 1,645,694 | Esgro | Oct. 18, 1927 |
| 1,672,362 | Brand | June 5, 1928 |
| 1,682,828 | Brand | Sept. 4, 1928 |
| 1,724,235 | Thornton et al. | Aug. 13, 1929 |
| 1,773,540 | Moss | Aug. 19, 1930 |
| 1,850,093 | Brand | Mar. 22, 1932 |
| 1,853,443 | Maul | Apr. 12, 1932 |
| 1,883,517 | Brand | Oct. 18, 1932 |
| 1,884,189 | Perkins | Oct. 25, 1932 |
| 1,913,735 | Thompson | June 13, 1933 |
| 1,919,219 | Hoffman | July 25, 1933 |
| 1,981,783 | De Bussey | Nov. 20, 1934 |
| 2,059,277 | Rand et al. | Nov. 3, 1936 |
| 2,066,750 | Tripp | Jan. 5, 1937 |
| 2,098,359 | Reynolds | Nov. 9, 1937 |
| 2,098,844 | Waxgiser | Nov. 9, 1937 |
| 2,124,906 | Bryce | July 26, 1938 |
| 2,127,769 | Esgro | Aug. 23, 1938 |
| 2,161,598 | Torkelson | June 6, 1939 |
| 2,174,715 | Baker | Oct. 3, 1939 |
| 2,176,384 | Varney | Oct. 17, 1939 |
| 2,195,844 | Von Pein | Apr. 2, 1940 |
| 2,270,905 | Seiler et al. | Jan. 27, 1942 |
| 2,276,293 | Farmer | Mar. 17, 1942 |
| 2,285,962 | Foulkes | June 9, 1942 |
| 2,310,445 | Lang | Feb. 9, 1943 |
| 2,344,675 | Burts | Mar. 21, 1944 |
| 2,353,002 | Armbruster | July 4, 1944 |
| 2,353,394 | Farmer | July 11, 1944 |
| 2,374,537 | Goldsmith | Apr. 24, 1945 |

OTHER REFERENCES

Publication—Business Week—April 15, 1939; page 41; Marketing—titled "Saunders' Keedozle Hits Stride."